United States Patent
Ookawa et al.

(10) Patent No.: US 9,356,548 B2
(45) Date of Patent: May 31, 2016

(54) VIBRATION DAMPING CONTROL APPARATUS FOR VEHICLE, VIBRATION DAMPING CONTROL SYSTEM FOR VEHICLE, AND VEHICLE MOTION CONTROL APPARATUS

(71) Applicant: DENSO CORPORATION, Kariya, Aichi-pref. (JP)

(72) Inventors: Isao Ookawa, Kariya (JP); Mamoru Sawada, Yokkaichi (JP); Takeshi Sada, Toyota (JP); Toshiki Matsumoto, Kariya (JP); Katsuyuki Mori, Ichinomiya (JP); Akihiko Yagyu, Kariya (JP); Yuuichi Minamiguchi, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/400,096

(22) PCT Filed: May 10, 2013

(86) PCT No.: PCT/JP2013/063212
§ 371 (c)(1),
(2) Date: Nov. 10, 2014

(87) PCT Pub. No.: WO2013/168808
PCT Pub. Date: Nov. 14, 2013

(65) Prior Publication Data
US 2015/0123624 A1 May 7, 2015

(30) Foreign Application Priority Data

May 10, 2012 (JP) ................. 2012-108808
Jan. 11, 2013 (JP) ................. 2013-003651
Jan. 11, 2013 (JP) ................. 2013-003654
Jan. 11, 2013 (JP) ................. 2013-003696

(51) Int. Cl.
*H02P 11/00* (2006.01)
*H02H 7/06* (2006.01)
(Continued)

(52) U.S. Cl.
CPC ............... *H02P 9/307* (2013.01); *B60W 10/06* (2013.01); *B60W 10/08* (2013.01); *B60W 10/26* (2013.01);
(Continued)

(58) Field of Classification Search
USPC ................................. 322/22; 290/44; 701/22
See application file for complete search history.

(56) References Cited

U.S. PATENT DOCUMENTS 4,320,308 A * 3/1982 Iwasaki .................. H03K 3/017
307/106
4,455,525 A * 6/1984 Morishita ............. H02J 7/1446
322/28

(Continued)

FOREIGN PATENT DOCUMENTS

EP 2036794 A2 3/2009
EP 2431217 A1 3/2012
(Continued)

OTHER PUBLICATIONS

Office Action issued Jul. 28, 2015 in corresponding Japanese Application No. PCT/JP2013/003651.
(Continued)

*Primary Examiner* — Pedro J Cuevas
(74) *Attorney, Agent, or Firm* — Harness, Dickey & Pierce, P.L.C.

(57) ABSTRACT

A vibration damping control apparatus for a vehicle is applied to a vehicle that includes: a generator that is driven by an internal combustion engine to generate electric power; a regulator that controls field current passing through an excitation winding of the generator, so that generated voltage of the generator turns to an externally instructed adjusting voltage; and a battery that charges generated voltage of the generator. The vibration damping control apparatus for a vehicle includes an adjusting voltage setting means for setting the adjusting voltage based on a charge supply power request value required for controlling a residual capacity of the battery and a drive torque request value for the generator required for suppressing vibration of the vehicle.

27 Claims, 31 Drawing Sheets

(51) Int. Cl.
| | |
|---|---|
| *H02P 9/00* | (2006.01) |
| *H02P 9/30* | (2006.01) |
| *B60W 10/06* | (2006.01) |
| *B60W 10/26* | (2006.01) |
| *B60W 10/30* | (2006.01) |
| *B60W 30/20* | (2006.01) |
| *B60W 30/02* | (2012.01) |
| *F16F 15/02* | (2006.01) |
| *F02D 29/06* | (2006.01) |
| *H02P 9/10* | (2006.01) |
| *F02D 41/14* | (2006.01) |
| *B60W 10/08* | (2006.01) |
| *B60W 30/188* | (2012.01) |
| *F03D 9/00* | (2006.01) |
| *H02P 9/04* | (2006.01) |

(52) U.S. Cl.
CPC .............. *B60W 10/30* (2013.01); *B60W 30/02* (2013.01); *B60W 30/1886* (2013.01); *B60W 30/20* (2013.01); *F02D 29/06* (2013.01); *F02D 41/1498* (2013.01); *F16F 15/02* (2013.01); *H02P 9/10* (2013.01); *B60W 2030/206* (2013.01); *B60W 2510/244* (2013.01); *B60W 2710/083* (2013.01); *B60W 2710/30* (2013.01); *F02D 2200/503* (2013.01); *F02D 2250/24* (2013.01); *F02D 2250/28* (2013.01)

(56) References Cited

U.S. PATENT DOCUMENTS

| | | | | |
|---|---|---|---|---|
| 4,535,252 | A * | 8/1985 | Jacobs | F03D 7/0272 290/4 R |
| 5,111,784 | A * | 5/1992 | Kuriyama | F02D 41/083 123/179.3 |
| 6,434,469 | B1 * | 8/2002 | Shimizu | B60K 6/44 180/197 |
| 7,592,785 | B2 * | 9/2009 | Kimura | B60L 15/025 322/28 |
| 9,184,686 | B2 * | 11/2015 | Minamiguchi | B60W 30/20 |
| 2002/0087252 | A1 * | 7/2002 | Shimizu | B60K 6/44 701/84 |
| 2004/0124742 | A1 | 7/2004 | Takemura et al. | |
| 2005/0034449 | A1 | 2/2005 | Frieden et al. | |
| 2005/0143896 | A1 | 6/2005 | Sawada et al. | |
| 2005/0200088 | A1 | 9/2005 | Sawada et al. | |
| 2006/0041353 | A1 | 2/2006 | Sawada et al. | |
| 2007/0216407 | A1 | 9/2007 | Yamaguchi | |
| 2008/0186000 | A1 * | 8/2008 | Kimura | B60L 15/025 322/23 |
| 2009/0071736 | A1 | 3/2009 | Mori et al. | |
| 2009/0128157 | A1 | 5/2009 | Moriya | |
| 2010/0286857 | A1 | 11/2010 | Otake | |
| 2011/0005212 | A1 | 1/2011 | Matsushita et al. | |
| 2011/0054726 | A1 | 3/2011 | Noumura | |
| 2012/0016549 | A1 | 1/2012 | Katsumata et al. | |
| 2012/0065826 | A1 | 3/2012 | Kinoshita et al. | |
| 2014/0183878 | A1 * | 7/2014 | Minamiguchi | B60W 30/20 290/40 C |

FOREIGN PATENT DOCUMENTS

| | | | |
|---|---|---|---|
| JP | H07123797 | A | 5/1995 |
| JP | H09277854 | A | 10/1997 |
| JP | H10253682 | A | 9/1998 |
| JP | 2003129927 | A | 5/2003 |
| JP | 2004129458 | A | 4/2004 |
| JP | 2005188324 | A | 7/2005 |
| JP | 2005256636 | A | 9/2005 |
| JP | 2006060936 | A | 3/2006 |
| JP | 2007009885 | A | 1/2007 |
| JP | 2007085772 | A | 4/2007 |
| JP | 2007225562 | A | 9/2007 |
| JP | 2007265975 | A | 10/2007 |
| JP | 2008022596 | A | 1/2008 |
| JP | 2009165230 | A | 7/2009 |
| JP | 2009183064 | A | 8/2009 |
| JP | 2009247037 | A | 10/2009 |
| JP | 4483985 | B2 | 6/2010 |
| JP | 2010173477 | A | 8/2010 |
| JP | 2013253592 | A * | 12/2013 |
| WO | 2010/121341 | A2 | 10/2010 |

OTHER PUBLICATIONS

International Preliminary Report on Patentability (in Japanese with English Translation) for PCT/JP2013/063212, issued Nov. 11, 2014; ISA/JP.
International Search Report (in Japanese with English Translation) for PCT/JP2013/063212, mailed Jun. 11, 2013; ISA/JP.
Office Action dated Sep. 2, 2014 issued in the corresponding JP application No. 2013-003654 in Japanese with English translation.
Office Action dated Jun. 3, 2014 issued in the corresponding JP application No. 2013-003696 in Japanese with English translation.
Supplemental Partial European Search Report dated Feb. 12, 2016 issued for PCT/JP2013/063212.

* cited by examiner

FIG.13
(a)
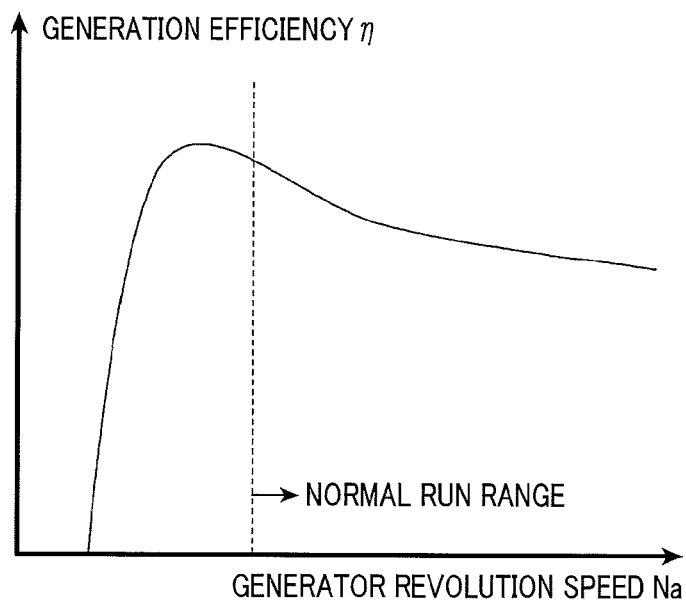
(b)
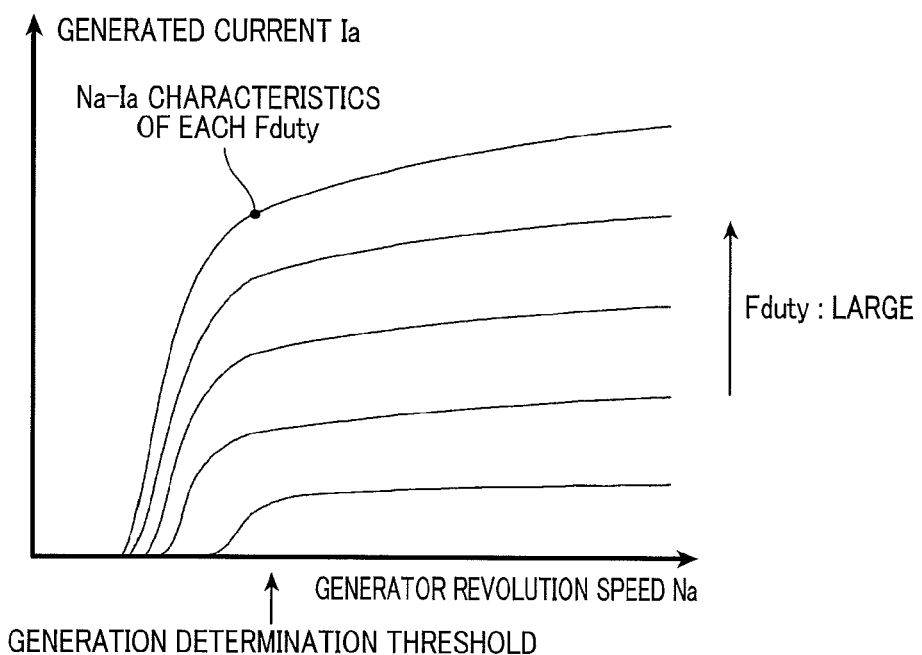

FIG.19
(a)
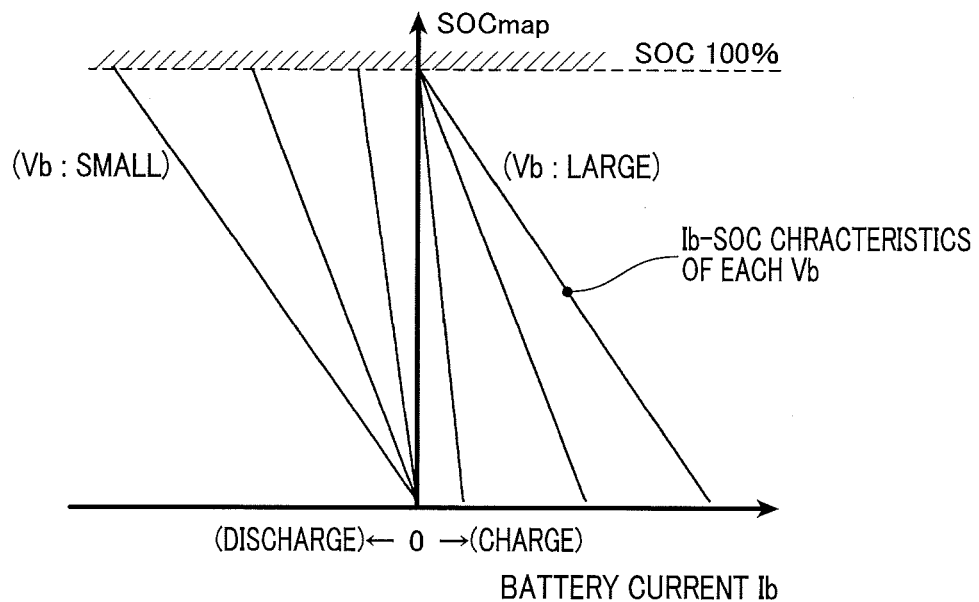
(b)
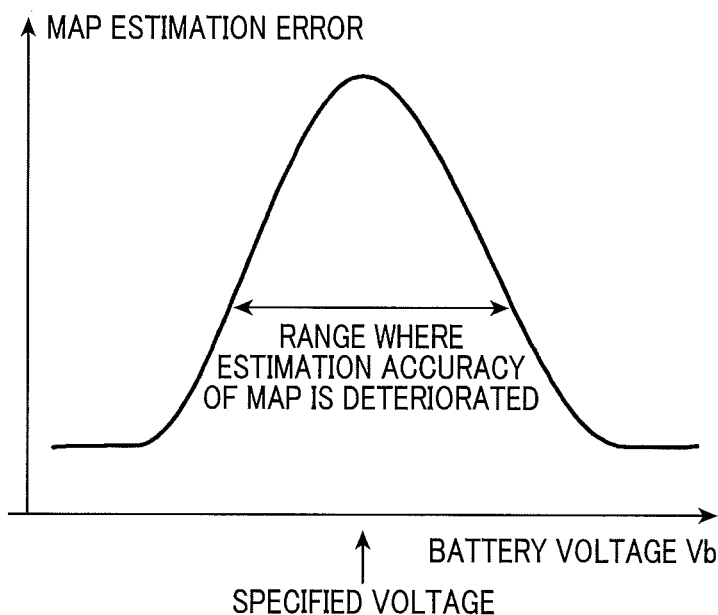

FIG.23
(a)
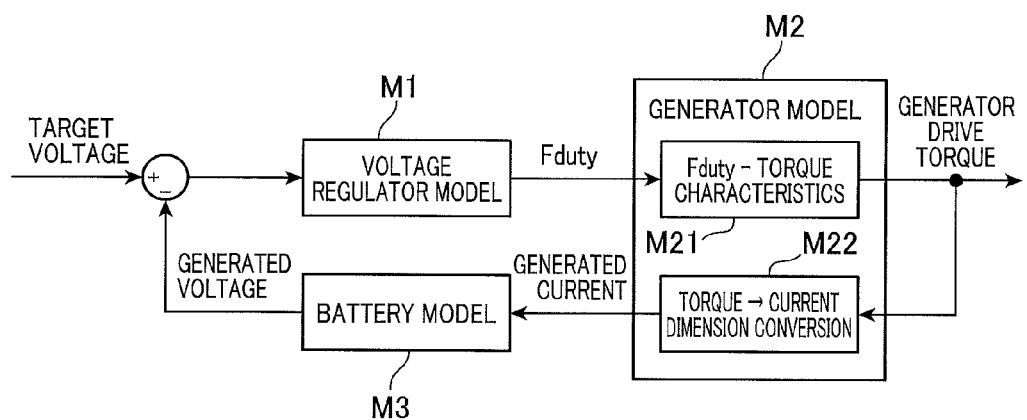
(b)
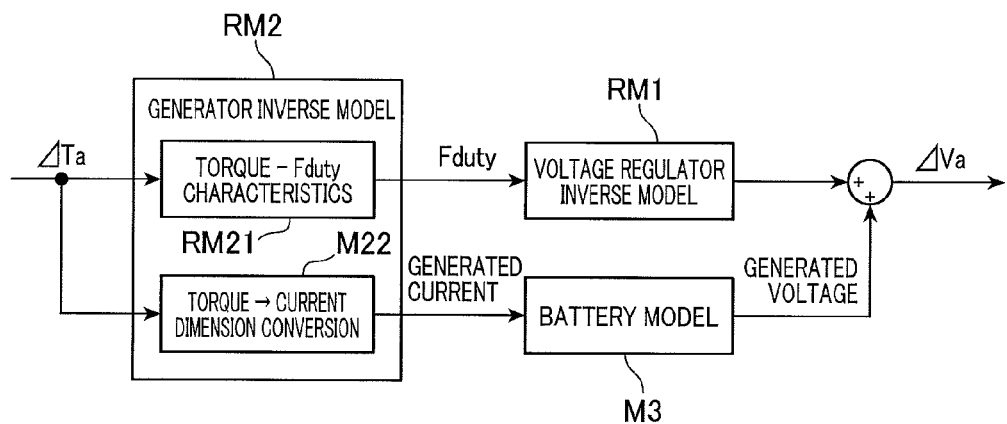

VIBRATION DAMPING CONTROL APPARATUS FOR VEHICLE, VIBRATION DAMPING CONTROL SYSTEM FOR VEHICLE, AND VEHICLE MOTION CONTROL APPARATUS

CROSS REFERENCE TO RELATED APPLICATIONS

This application is a U.S. National Phase Application under 35 U.S.C. 371 of International Application No. PCT/JP2013/063212 filed on May 10, 2013 and published in Japanese as WO 2013/168808 A1 on Nov. 14, 2013. This application is based on and claims the benefit of priority from Japanese Application No. 2012-108808 filed on May 10, 2012, and Application No. 2013-003696, Application No. 2013-003651, and Application No. 2013-003654 all filed Jan. 11, 2013. The entire disclosures of all of the above applications are incorporated herein by reference.

TECHNICAL FIELD

The present invention relates to a vibration damping control apparatus for a vehicle and a vibration damping control system for a vehicle, which suppress vibration of a vehicle using rotary drive torque of a generator to properly damp the vibration.

Further, the present invention relates to a vehicle motion control apparatus that controls a vehicle motion using drive torque of a generator.

BACKGROUND ART

Vibrations of a vehicle include a twist vibration that is a vibration caused by twisting such as of a crank shaft, a drive shaft, or the like of an engine, a pitching vibration that is a vibration of the vehicle in the pitching direction caused by a driving force or a braking force, and vibration of the engine.

JP-B-4483985 describes vibration damping control, focusing on making use of drive torque of an engine-driven generator, as an engine load for vibration damping. Under the control, the generation amount of the generator is varied such that the drive torque of the generator can suppress the vibration. According to this, the vibration of the vehicle can be suppressed by the drive torque of the generator.

In a vehicle as represented by a passenger car, it is well known that variations in the torque applied to a wheel shaft (wheel-shaft torque) causes unnecessary vibrations in various parts of the vehicle body. Specifically, the unnecessary vibrations include a vibration of the vehicle body (1 to 5 Hz), an engine-mounting system vibration (7 to 15 Hz), and a vibration of the chassis or the tires (not less than 10 Hz). These vibrations not only impair the car's ride but also become the factors of varying wheel's ground weight. Therefore, these vibrations may lead to lowering of the motion performance.

In contrast, in a known apparatus (e.g., see JP-A-2009-165230), an in-vehicle generator (e.g. alternator) that is driven by an engine is used as a vibration-damping actuator. Use of the generator in this way can vary the generation amount such that the drive torque of the generator can suppress the vibrations mentioned above, thereby correcting output-shaft torque of the engine, or further correcting wheel-shaft torque.

SUMMARY OF THE INVENTION

Problems to be Solved by the Invention

JP-B-4483985 describes that, under the vibration damping control, target generator torque for suppressing vibration is calculated. However, no mention is made as to how the target generator torque is realized.

In the conventional apparatus described in JP-A-2009-165230, various devices (generator, regulator, battery, etc.) configure a control system that varies drive torque of the generator on the basis of a command value for correcting wheel-shaft torque. When these devices have a fault, or sensors, or the like, for deriving states of these devices have a fault, deterioration of the devices configuring the control system may be accelerated, or operation of other in-vehicle equipment may be adversely affected by the fault.

Specifically, for example, when the battery is activated in a state of being overcharged or overdischarged, deterioration of the battery is problematically accelerated, or when the residual capacity of the battery is not sufficiently ensured, operation of other in-vehicle equipment that consume electric power is problematically adversely affected.

Further, in the conventional apparatus described in JP-A-2009-165230, a component for battery charge control is superposed over a component for braking/driving control of the vehicle to obtain a target generated current. The target generated current is used for controlling the alternator to balance two functions of stabilizing vehicle power voltage and controlling braking/driving forces.

The control based on the target generated current is applicable to a battery, such as a lithium battery having a small internal resistance used such as in a hybrid car or an electric car, having a large current accepting capacity. However, the control based on the target generated current suffers from a problem of not being able to effectively exert the function in a battery, such as a lead battery used in generally-used vehicles, having a small current accepting capacity.

Further, taking account of using the drive torque of the generator for the control of the vehicle motion, such as vibration damping control, it is necessary to realize the control with various frequencies depending on the controlled objects. However, devices, such as a generator and a battery, of a power source system are originally used for the purpose of performing steady supply of power source by controlling a charge state of the battery, which varies quite slowly (less than 1 Hz). Therefore, when a controlled object varies with a frequency higher than the variation of the charge state of the battery, a command for the controlled object is attenuated to a large extent, raising a problem that a desired drive torque is not necessarily achieved.

The present aims to provide a vibration damping control apparatus for a vehicle and a vibration damping control system for a vehicle, which realize vibration damping of the vehicle using drive torque of the generator.

Further, the present invention aims to provide a vehicle motion control apparatus that realizes proper control according to the states of the devices configuring a control system.

Further, the present invention has an object of providing a vehicle motion control apparatus that is usable irrespective of the type of battery, and enables use of the drive torque of the generator for various motion controls.

Means of Solving the Problems

The invention that achieves the above objects has the following characteristics. Specifically, the invention has a premise of being applied to a vehicle including a generator that is driven by an internal combustion engine to generate electric power, a regulator that controls field current passing through an excitation winding of the generator, so that generated voltage of the generator turns to externally instructed adjusting voltage command value, and a battery that charges the generated power of the generator. The invention includes an adjusting voltage setting means for setting the adjusting voltage based on drive torque (correction torque) of the generator required for suppressing vibration of the vehicle, and charge supply power required for retaining generated power that varies depending on the drive torque, within a range of being accepted.

According to this, an adjusting voltage is determined for the purpose of suppressing vibration of the vehicle. Accordingly, by activating the regulator on the basis of the adjusting voltage, the vibration of the vehicle is suppressed and damped by the correction torque of the generator. Thus, vibration suppression of the vehicle can be realized by only calculating and setting adjusting voltage required for executing the correction torque.

In the present invention, the adjusting voltage setting means may be configured by a capacity retention component calculating means and a vibration suppression component calculating means. In this case, the capacity retention component calculating means calculates a voltage command value of a capacity retention component (Vdc) of the adjusting voltage, the component being required for controlling a residual capacity of the battery. The vibration suppression component calculating means calculates a voltage command value of a vibration suppression component ($\Delta$VC) of the adjusting voltage, the component corresponding to the drive torque of the generator required for suppressing the vibration of the vehicle.

Further, the capacity retention component calculating means may calculate a voltage command value of the capacity retention component (Vdc) from a charge supply power request value having a frequency lower than that of the vehicle vibration that is a controlled object. The vibration suppression component calculating means may calculate a voltage command value of the vibration suppression component ($\Delta$VC) from a drive torque request value having a frequency of not less than that of the vehicle vibration that is a controlled object. In this case, the vibration suppression component ($\Delta$VC) is superposed on a voltage command value of the capacity retention component (Vdc) to provide a waveform as an adjusting voltage (Va) which is rendered to be a voltage command for the generator. The vibration suppression component and the capacity retention component configuring the voltage command (adjusting voltage) have different frequencies and thus do not interfere with each other, individually acting as independent commands.

In a vehicle motion control apparatus of the present invention, the battery is charged with generated power of the generator which is driven by the internal combustion engine, and the regulator controls the field current passing through the excitation winding of the generator, according a command value.

However, a capacity retention command value generating means generates a capacity retention command value that is a command value for activating the regulator so as to obtain supply power required for retaining, within a predetermined range, a battery state quantity indicating a charge state of the battery. Further, a motion control command value generating means generates a motion control command value that is a command value for activating the voltage regulator such that the generator generates motion control torque that is torque required for controlling vehicle motion specified in advance.

Then, in the motion control command value generating means, a limiting means limits a motion control command value according to the state of devices that configure a control system.

In the vehicle motion control apparatus configured in this way, a motion control command value is limited according the states of the generator, the battery, the regulator, and the like, which are the devices configuring the control system. Accordingly, control suitable for a fault or the deterioration of each of the devices can be performed. As a result, the deterioration of the devices configuring the control system is prevented from being accelerated, or operations of other in-vehicle equipment are prevented from being adversely affected, thereby improving reliability of the apparatus.

Further, in the vehicle motion control apparatus of the present invention, the voltage regulator controls field current passing through the excitation winding of the generator, such that the battery is charged with the generated power of the generator that is driven by the internal combustion engine, and the generated voltage of the generator turns to target voltage.

However, a capacity retention component generating means generates a capacity retention component that is a component of target voltage for activating the voltage regulator so as to obtain supply power required for retaining, within a predetermined range, a battery state quantity indicating a charge state of the battery. Further, a motion control component generating means generates a motion control component that is a component of target voltage for activating the voltage regulator such that the generator generates motion control torque that is torque required for controlling vehicle motion specified in advance. Then, a target voltage generating means superposes the motion control component on the capacity retention component to generate the target voltage.

It should be noted that the motion control component generating means uses a control model as a basis, the control model being a modelization of a control system that generates drive torque of the generator according to the target voltage, the modelization being provided taking account of dynamic characteristics possessed by the control system, to thereby calculate the motion control component from the motion control torque by using a control inverse model that is an inverse model of the control model.

According to the vehicle motion control apparatus of the present invention configured in this way, the control system including the battery is controlled using a voltage as a target value. Accordingly, the apparatus can be applied to any battery, irrespective of the type of the battery, or in particular, irrespective of the current accepting capacity thereof.

Further, according to the vehicle motion control apparatus of the present invention, the control inverse model used for calculating the motion control component is provided, taking account of the dynamic characteristics possessed by the control system. Accordingly, when the calculated motion control component is permitted to act on the actual control system, the influence of the dynamic characteristics possessed by the control system (frequency-basis gain variation) can be cancelled. As a result, motion control can be performed with high accuracy over a wide range of a frequency band.

BRIEF DESCRIPTION OF THE DRAWINGS

FIG. 13 shows graphs indicating characteristics of a generator, with (a) showing a relationship between generator revolution speed and generation efficiency (generation efficiency map), and with (b) showing a relationship between generator revolution speed and generated current (generated current map);

FIG. 19 illustrates graphs explaining an estimation map used for estimating a charge state, with (a) showing a relationship between battery current and charge-state estimate value, and with (b) showing a relationship between battery voltage and estimation errors;

FIG. 23 illustrates block diagrams of models used for calculating a motion control component, with (a) showing a control model (forward-direction model), and with (b) showing a control inverse model (inverse-direction model);

EMBODIMENTS FOR CARRYING OUT THE INVENTION

With reference to the drawings, hereinafter is described an embodiment of a vibration damping control apparatus for a vehicle of the present invention.

Figure 1:
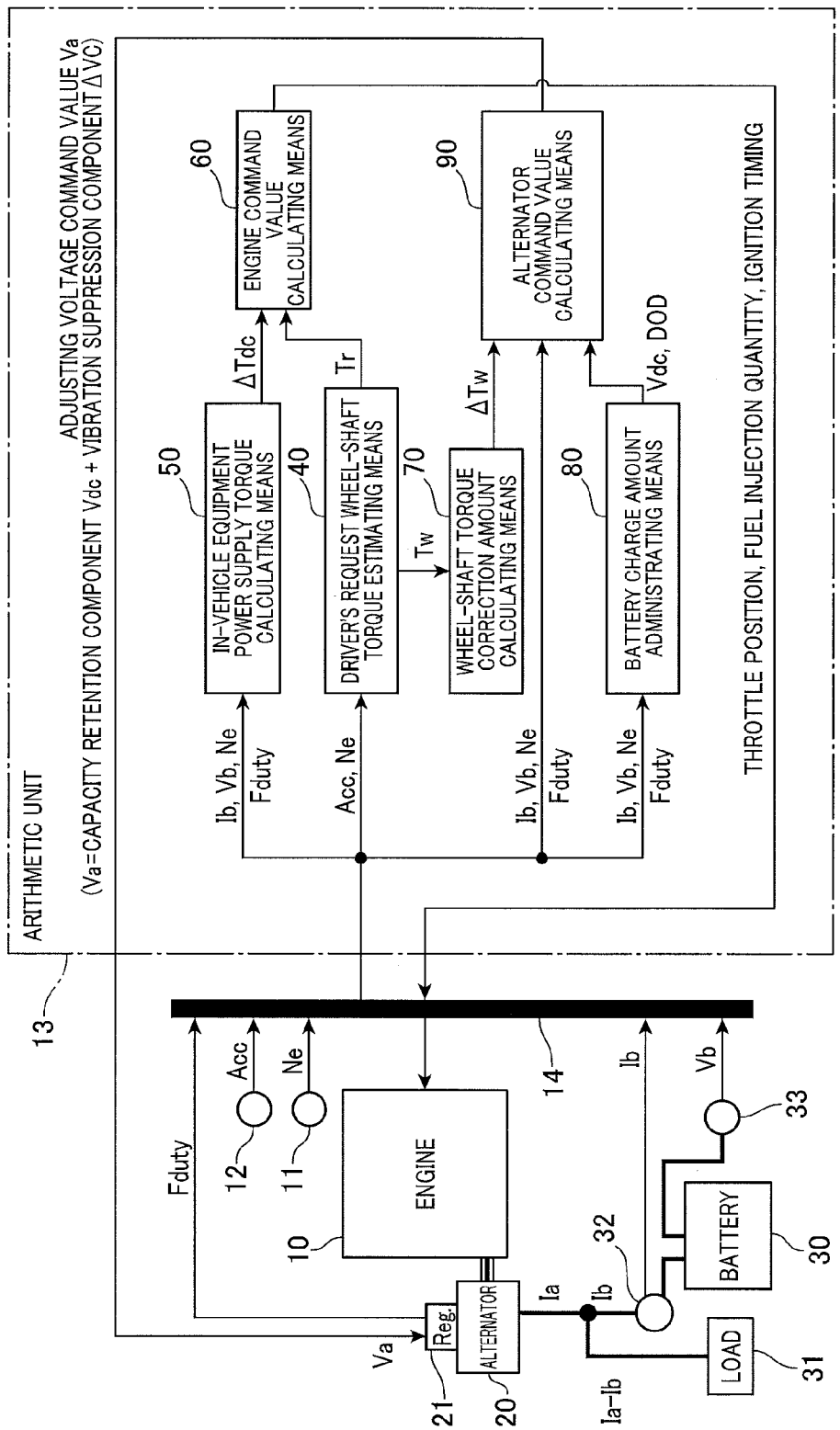
FIG. 1 is a block diagram illustrating a vibration damping control apparatus for a vehicle, according to an embodiment of the present invention.

As shown in FIG. 1, a vehicle, to which the vibration damping control apparatus for a vehicle is applied, includes an ignition type engine 10 for running (internal combustion engine), an alternator 20 (generator) that generates electric power by being rotatably driven by the engine 10, a battery 30 that charges the generated power of the generator, and an arithmetic unit (ECU 13) that controls operations of the engine 10 and the alternator 20.

The ECU 13 calculates engine commands values, such as ignition timing, a fuel injection quantity and a throttle position, for transmission to a communication bus line 14. An ignition device and various actuators such as a fuel injection valve and an electric throttle valve possessed by the engine 10 are activated on the basis of the engine command values calculated by the ECU 13.

It should be noted that detection values of various sensors are transmitted to the communication bus line 14, the sensors including a crank angle sensor 11, an acceleration sensor 12, a current sensor 32, a voltage sensor 33, and the like. The crank angle sensor 11 outputs a signal used for calculating the number of revolutions of a crank shaft per time (engine speed Ne). The acceleration sensor 12 outputs a signal used for calculating a manipulated variable of pressing an accelerator pedal (accelerator position Acc) manipulated by the vehicle's driver. The current sensor 32 outputs a detection value of a terminal current of the battery 30 (battery current Ib). The voltage sensor 33 outputs a detection value of a terminal voltage of the battery 30 (battery voltage Vb). It should be noted that, based on a sign of the battery current Ib, whichever of charge current and discharge current can be specified.

The ECU 13 calculates a command value for an adjusting voltage Va described below, for transmission to a regulator 21 via a communicating means having a communication speed which is sufficient enough for control. The regulator 21 duty-controls a field current that passes through an excitation winding of the alternator 20, so that the generated voltage of the alternator 20 turns to the adjusting voltage Va which is externally instructed.

Specifically, when the generated voltage (corresponding to the battery voltage Vb) is lower than the adjusting voltage Va, a duty value Fduty of the field current is raised to increase the field current. Thus, the generation amount is increased to raise the generated voltage. On the other hand, when the generated voltage is higher than the adjusting voltage Va, the Fduty is lowered to decrease the field current. Thus, the generation amount is decreased to lower the generated voltage. The operation of the regulator 21 in this way can contribute to retaining the generated voltage to the adjusting voltage Va, even when the number of revolutions of the alternator per predetermined time period (alternator revolution speed Na) varies in accordance with the variation of the engine speed Ne.

Further, the ECU 13 sets a command value for the adjusting voltage Va so that the residual capacity of the battery 30 is retained within a preset allowable control range. The allowable control range refers to a range that does not allow the residual capacity of the battery 30 to be a full charge and prevents deterioration speed of the battery from being extremely accelerated. With this allowable control range, a generated power component corresponding to a vibration suppression component ΔVC discussed later can be accepted by the battery. Specifically, when the residual capacity of the battery is reduced beyond the allowable control range, the adjusting voltage Va is raised to increase charge supply power and rapidly restore the residual capacity of the battery to within the allowable control range. On the other hand, when the residual capacity of the battery is increased beyond the allowable control range, the adjusting voltage Va is lowered to decrease charge supply power and prevent the battery 30 from being in a full-charge state.

The drive torque of the alternator 20 can be a load of the engine 10. Therefore, the generation amount of the alternator 20 is changed in conformity with a request torque from the arithmetic unit that has a vibration control function for the vehicle, thereby properly suppressing the vibration of the vehicle. In this regard, in the present embodiment, drive torque (correction torque) required for suppressing the vehicle vibration is calculated by the arithmetic unit to calculate a command value for the adjusting voltage Va, which is required for realizing the correction torque. In short, as mentioned above, the ECU 13 superposes a component of the adjusting voltage for controlling the vehicle vibration (vibration suppression component ΔVC) on a component of the adjusting voltage for retaining the residual capacity of the battery within the allowable control range (capacity retention component Vdc), to calculate a command value for the adjusting voltage Va.

In this case, the voltage of the capacity retention component Vdc is subjected to low-pass filter processing so as to have a frequency lower than that of vehicle vibration that is a controlled object, while the voltage of the vibration suppression component ΔVC is calculated from a drive torque request value having a frequency of not less than that of the vehicle vibration that is a controlled object. In this way, permitting the components Vdc and ΔVC to have different frequencies, the voltage that is a target of control is prevented from being vibrated due to the interference between two controllers having different purposes.

FIG. 1 is a block diagram in which various means 40, 50, 60, 70, 80 and 90 are shown on a function-basis to indicate contents of calculations of the microcomputer possessed by the ECU 13. The engine command value and the adjusting voltage command Va mentioned above are calculated by these means 40 to 90. It should be noted that the means 70, 80 and 90 correspond to an adjusting voltage setting means.

Figure 2:
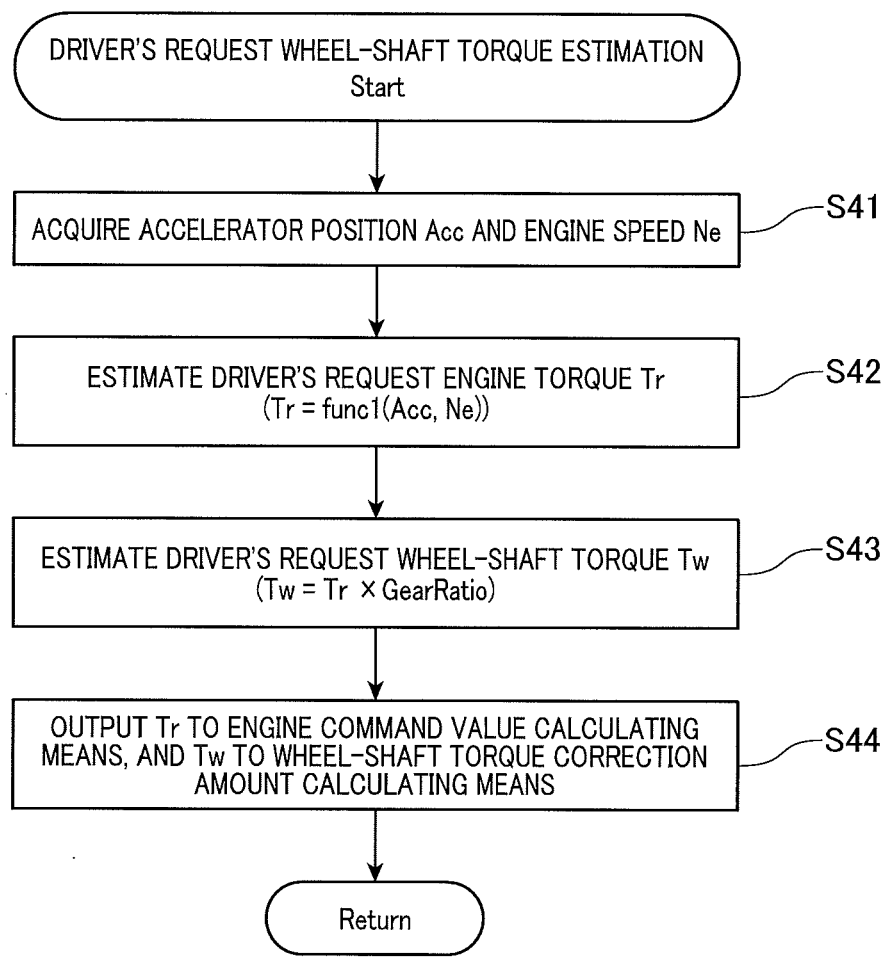
FIG. 2 is a flow chart illustrating a procedure of an arithmetic operation performed by a driver's request wheel-shaft torque estimating means of FIG. 1.

The driver's request wheel-shaft torque estimating means 40 repeatedly calculates a driver's request engine torque Tr and a driver's request wheel-shaft torque Tw along a procedure shown in FIG. 2 at a cycle that can at least maintain the waveform of the wheel-shaft torque Tw. In other words, in step S41 first, the engine speed Ne and the accelerator position Acc are acquired via the communication bus line 14.

In subsequent step S42, the engine torque Tr is estimated according to a function fund. Specifically, the accelerator position Acc is converted to a throttle position, followed by calculating an engine load factor from the throttle position and the engine speed Ne, using a characteristics map which is based on measurements made such as in bench tests. Specifically, a relationship is established in which the throttle position changes according to the accelerator position Acc, and the throttle position and the magnitude of the engine load determine the engine speed Ne. On the basis of the engine load factor and the engine speed Ne calculated in this way, the driver's request engine torque Tr is calculated using the map.

Although not shown in the figures, the similar advantages are obtained through another method in which the driver is permitted to determine the request engine torque Tr from the acquired accelerator position Acc and the engine speed Ne to control a throttle position obtained from an inverse function of the map.

In subsequent step S43, the driver's request engine torque Tr is converted to the wheel-shaft torque Tw. Specifically, a gear ratio covering the crank shaft to the wheel-shaft including a differential gear is multiplied by the driver's request engine torque Tr to calculate the driver's request wheel-shaft torque Tw. In subsequent step S44, the driver's request engine torque Tr is outputted to the engine command value calculating means 60, while the driver's request wheel-shaft torque Tw is outputted to the wheel-shaft torque correction amount calculating means 70.

Although not shown in the figures, the similar advantages are obtained by calculating the driver's request wheel-shaft torque Tw first from the accelerator position Acc that is determined by the vehicle driver's manipulation of the accelerator, and dividing the calculated driver's request wheel-shaft torque Tw by a gear ratio covering the crank shaft to the wheel-shaft including the differential gear, thereby achieving conversion to the driver's request engine torque Tr.

Figure 3:
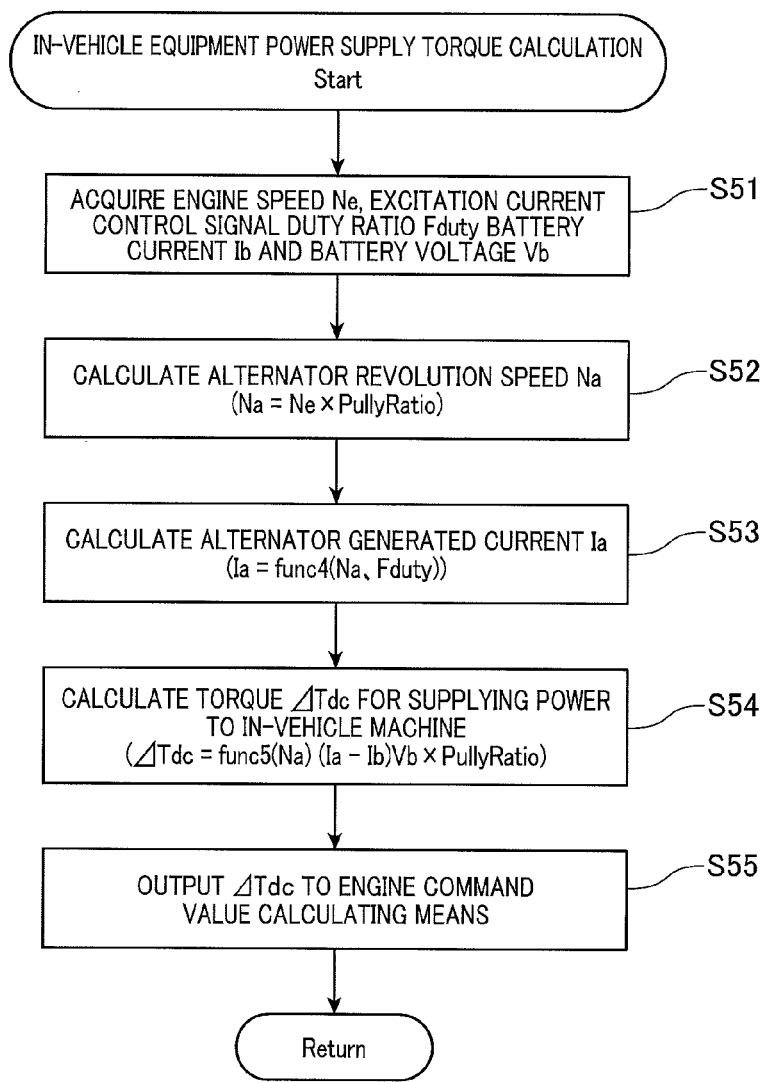
FIG. 3 is a flow chart illustrating a procedure of an arithmetic operation performed by an in-vehicle equipment power-supply torque calculating means of FIG. 1.

The in-vehicle equipment power-supply torque calculating means 50 repeatedly calculates, along a procedure shown in FIG. 3, torque for supplying electric power to in-vehicle equipment 31 (electrical load shown in FIG. 1) (consumed-power torque ΔTdc) at the cycle mentioned above. Specifically, in step S51 first, the engine speed Ne, the field current duty value Fduty, the battery current Ib and the battery voltage Vb are acquired via the communication bus line 14.

In subsequent step S52, the acquired engine speed Ne is multiplied by a pulley ratio to calculate the alternator revolution speed Na. In subsequent step S53, the acquired duty value Fduty and the alternator revolution speed Na are used as bases to calculate a current outputted from the alternator 20 (alternator-generated current Ia).

In subsequent step S54, the acquired battery current Ib is subtracted from the alternator-generated current Ia to calculate a current passed to the in-vehicle equipment 31 (consumed current Ia−Ib). Then, based on the calculated consumption current Ia−Ib, the battery voltage Vb and the alternator revolution speed Na, the power consumption torque ΔTdc mentioned above is calculated according to a function func5. Specifically, the power consumption torque ΔTdc is calculated according to an arithmetic expression shown in FIG. 3 (a). Note that, in the arithmetic expression, η indicates an energy conversion efficiency of the alternator 20, and T indicates the consumed-power torque ΔTdc. In subsequent step S55, the calculated power consumption torque ΔTdc is subjected to low-pass filter processing (LPF) to remove signal components of a frequency band that is an object of vibration damping control. Then, the resultant power consumption torque ΔTdc is outputted to the engine command value calculating means 60.

Figure 4:
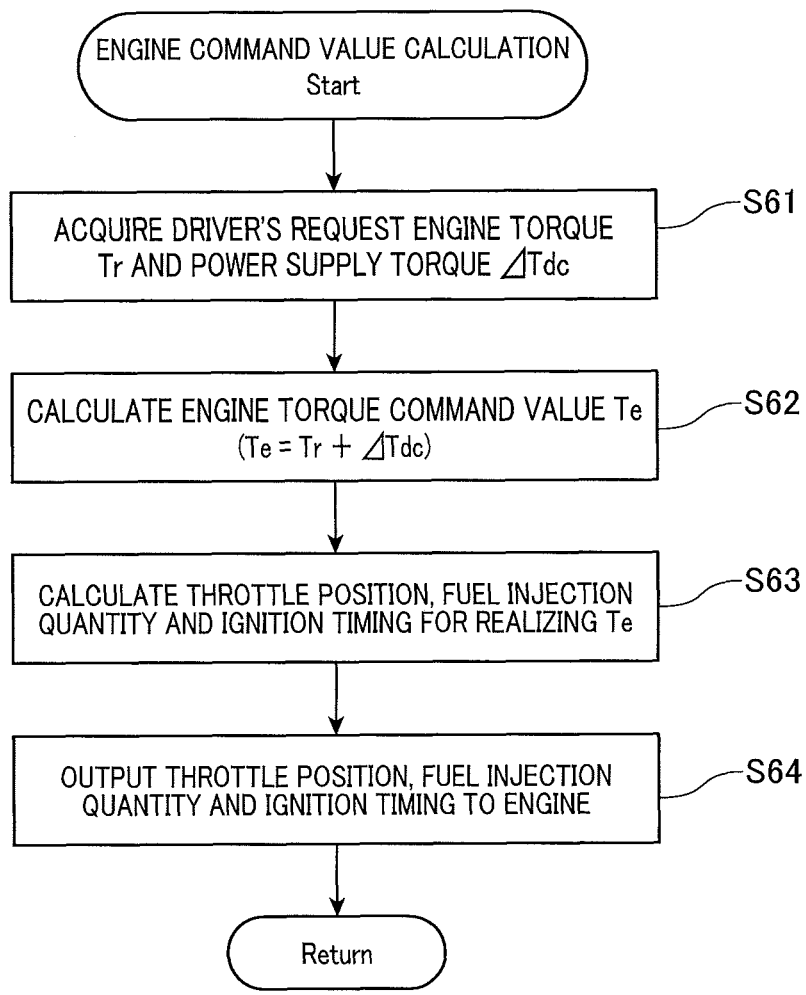
FIG. 4 is a flow chart illustrating a procedure of an arithmetic operation performed by an engine command value calculating means of FIG. 1.

The engine command value calculating means 60 repeatedly calculates, along a procedure shown in FIG. 4, the engine command value mentioned above at the cycle mentioned above. Specifically, in step S61 first, the driver's request engine torque Tr and the consumed-power torque ΔTdc mentioned above are acquired.

In subsequent step S62, the consumed-power torque ΔTdc is added to the acquired driver's request engine torque Tr to calculate an engine torque command value Te. It should be noted that FIG. 9 (a) shows a waveform that indicates temporal variation of the driver's request engine torque Tr which sequentially varies according to the accelerator pedal manipulation. Further, FIG. 9 (b) shows a waveform that indicates temporal variation of the consumed-power torque ΔTdc which sequentially varies according to the electrical load variation of the in-vehicle equipment 31. Thus, a waveform obtained by superposing these waveforms on each other corresponds to temporal variation of the engine torque command Te.

In short, the driver's accelerator pedal manipulation component is permitted to include the electrical load variation component of the in-vehicle equipment 31 to calculate the engine torque command Te. Then, in subsequent step S63, a throttle position, a fuel injection quantity and ignition timing for realizing the calculated engine torque command value Te are calculated, using a map or the like, that is prepared based on measurements made in bench tests. In subsequent step S64, a command value for the calculated throttle position, fuel injection quantity and ignition timing, as an engine command value, is transmitted to the communication bus line 14. The above-mentioned various actuators possessed by the engine 10 are activated according to the engine command value.

Figure 5:
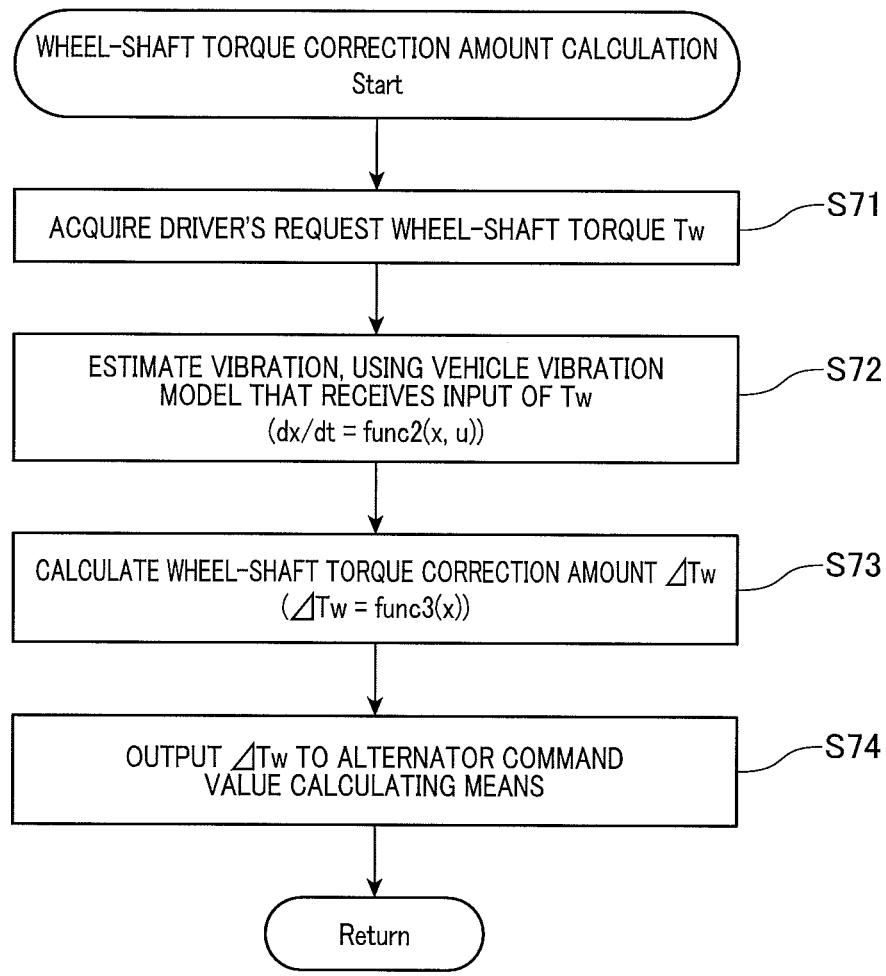
FIG. 5 is a flow chart illustrating a procedure of an arithmetic operation performed by a wheel-shaft torque correction amount calculating means of FIG. 1.

The wheel-shaft torque correction amount calculating means 70 repeatedly calculates, along a procedure shown in FIG. 5, a wheel-shaft torque (wheel-shaft torque correction amount ΔTw), which corresponds to the drive torque of the alternator 20, required for cancelling the vibration of the vehicle, at the cycle mentioned above. Specifically, in step S71 first, the wheel-shaft torque correction amount calculating means 70 acquires the driver's request wheel-shaft torque Tw mentioned above. In subsequent step S72, the wheel-shaft torque correction amount calculating means 70 inputs the acquired driver's request wheel-shaft torque Tw to a vehicle vibration model to estimate a state of vibration caused in the vehicle. In the figures, x indicates a state quantity vector (vibration displacement/speed in each part of the vehicle body), and u indicates an input vector (driver's request wheel-shaft torque Tw). A specific example of a vehicle vibration model may be an on-spring vibration model or the like illustrated in FIG. 4 of JP-A-2006-060936. A vehicle model used herein is a linear model derived from a motion equation of a vehicle. In the figure, a function func2 is expressed by "dx/dt=Ax+Bu" where A and B are arrays of constants.

In subsequent step S73, the wheel-shaft torque correction amount calculating means 70 calculates the wheel-shaft torque correction amount ΔTw on the basis of the estimated vibration state. The wheel-shaft torque correction amount ΔTw corresponds to the drive torque of the alternator 20 for suppressing the vibration of the vehicle. The vehicle vibration is ensured to be suppressed by setting the adjusting voltage command Va, taking account of the correction amount ΔTw. Then, in order to suppress the vehicle vibration speed resulting from the setting, the wheel-shaft torque correction amount calculating means 70 feeds back the state quantity x to calculate the wheel-shaft torque correction amount ΔTw. When a gain of the feedback is indicated by K, a function func3 in the figure is expressed by "ΔTw=−Kx". In subsequent step S74, the wheel-shaft torque correction amount calculating means 70 outputs the calculated wheel-shaft torque correction amount ΔTw to the alternator command value calculating means 90.

Figure 6:
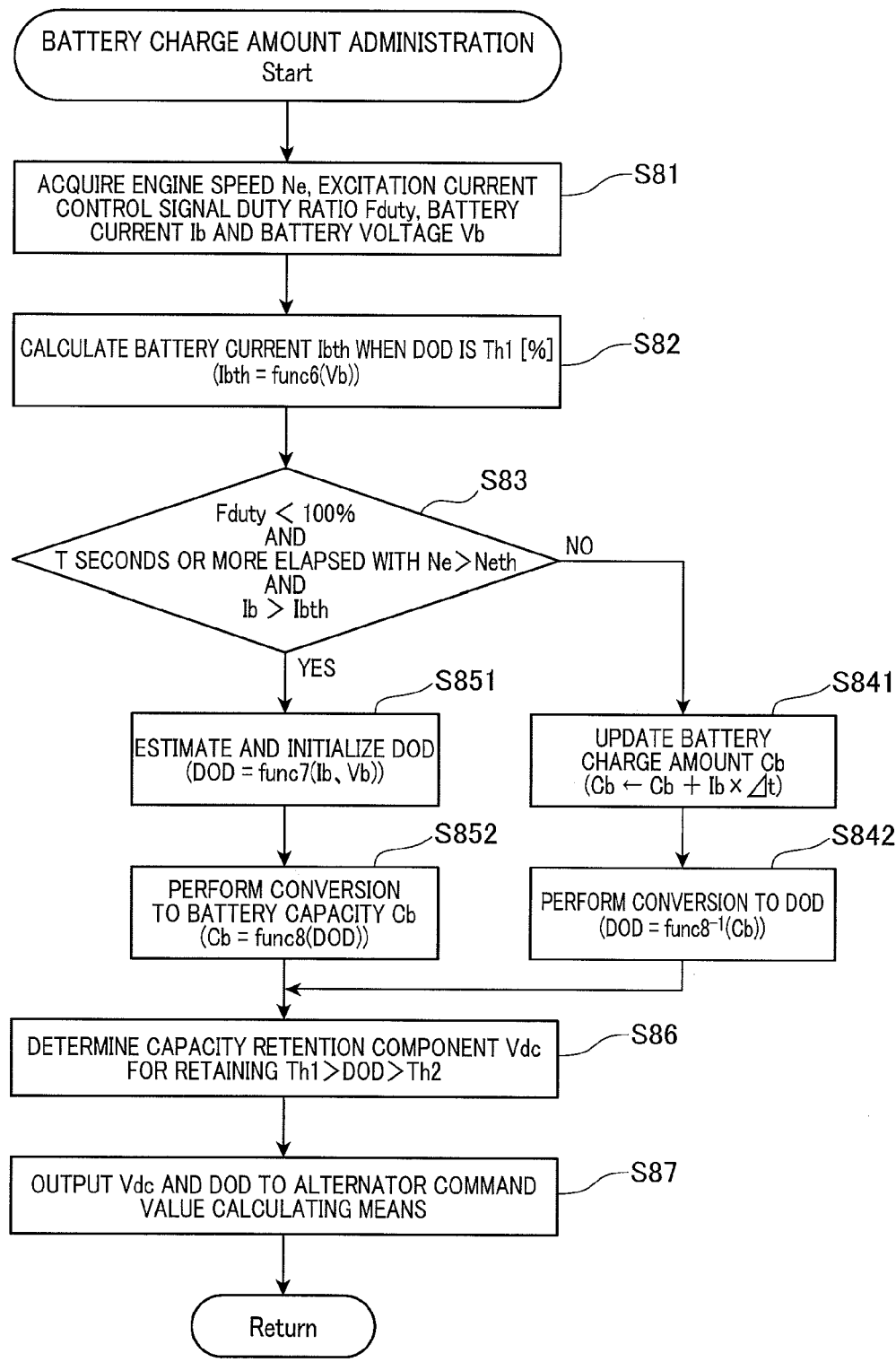
FIG. 6 is a flow chart illustrating a procedure of an arithmetic operation performed by a battery charge amount administrating means of FIG. 1.

The battery charge amount administrating means 80 repeatedly calculates, along a procedure shown in FIG. 6, the capacity retention component Vdc mentioned above and a battery capacity at the cycle mentioned above. In this case, a rate of decrease DOD (depth of discharge) from a full charge is calculated as a correlation value of the battery capacity. In permitting the residual capacity of the battery to be retained within the allowable control range by the capacity retention component Vdc, a DOD corresponding to a lower limit of the allowable control range is rendered to be Th1, and a DOD corresponding to an upper limit is rendered to be Th2. Accordingly, the capacity retention component Vdc is calculated so as to satisfy a relation Th1>DOD>Th2.

Specifically, in step S81 first, the battery charge amount administrating means 80 acquires the engine speed Ne, the field current duty value Fduty, the battery current Ib and the battery voltage Vb. In subsequent step S82, the battery charge amount administrating means 80 calculates a battery current Ibth, where DOD is Th1, from the acquired battery voltage Vb using a function func6. Note that the function func6 is a relational expression identified from Ibth–Vb characteristics that are obtained from tests conducted in advance. Instead of using the function func6, the Ibth–Vb characteristics may be stored in a map, for example, and the battery current Ibth may be calculated from the battery voltage Vb using the map.

In subsequent step S83, the battery charge amount administrating means 80 determines whether or not the DOD has increased to Th1 (whether or not the battery capacity has decreased to the lower limit), on the basis of whether or not the acquired battery current Ib has increased beyond Ibth. It should be noted that, a larger DOD leads to higher current acceptability and accordingly to a larger battery current Ib.

However, the battery charge amount administrating means 80 determines DOD>Th1 as being satisfied in a case where the following requirements 1 and 2 are met and Ib>Ibth is satisfied. Specifically, the requirement 1 is that supply power to the in-vehicle equipment is not excessively large and the generation amount is not saturated. For example, if Fduty<100%, the requirement 1 is determined to be met. The requirement 2 is that the engine is in a complete-explosion state. For example, if a state where the engine speed Ne is not less than a lower limit Neth of idling has continued for T seconds or more, the requirement 2 is determined to be met.

If it is determined that DOD has not increased to Th1 (NO in S83), the battery charge amount administrating means 80 adds, at a subsequent step S841, the charge amount Ib×Δt corresponding to the acquired battery current Ib to a battery capacity Cb to update Cb. In this case, the battery charge amount administrating means 80 stores a value of Cb in a non-volatile memory, with an initial value being the last value of the previously executed battery charge amount administration. In subsequent step S842, the battery charge amount administrating means 80 converts the calculated Cb to DOD using a function func8$^{-1}$.

However, a function func8 is expressed by "Cb=$C_{b\_MAX}$·(100−DOD)/100" where $C_{b\_MAX}$ indicates a battery capacity in a full-charge state. The function func8$^{-1}$ is expressed by solving this formula in terms of DOD.

On the other hand, in subsequent step S851, if it is determined that DOD has increased to Th1 (YES in S83), the battery charge amount administrating means 80 initializes DOD to a value of Th1. Alternatively, the battery charge amount administrating means 80 estimates and initializes DOD using a function func7 on the basis of the acquired battery current Ib and battery voltage Vb. However, the function func7 is a relational expression identified through experiments.

In subsequent step S852, DOD is converted to the battery capacity Cb using the function func8.

In subsequent step S86, the battery charge amount administrating means 80 determines the capacity retention component Vdc for retaining Th1>DOD>Th2 on the basis of the estimated value of DOD. For example, the relationship between the capacity retention component Vdc and DOD is acquired and stored in a map or the like in advance by conducting tests. Using the map, the battery charge amount administrating means 80 calculates the capacity retention component Vdc from DOD. In order to avoid a control interference with the vibration suppression component ΔVC, the capacity retention component Vdc is subjected to signal processing using a lowpass filter whose frequency is lower than that of the vehicle vibration that is a controlled object. For example, when there is a variation in a request of the capacity retention component Vdc corresponding to DOD, the frequency of the capacity retention component Vdc is prevented from interfering with the frequency of the vibration suppression component ΔVC and becoming uncontrollable. Further, an upper limit of the battery capacity (i.e. lower limit Th2 of DOD) is set to a value smaller than full charge, so that a generated power component corresponding to the vibration suppression component ΔVC can be accepted by the battery 30.

In short, through the processings in S83, S841, S842, S851 and S852, DOD is estimated on the basis of the battery current Ib and the battery voltage Vb. However, at a point where Ib=Ibth is satisfied (YES in S83), the battery charge amount administrating means 80 initializes a DOD estimate value to an estimate value of Th1 or Th1 (S851). Thus, an estimation error for DOD is ensured to be suppressed. Then, in subsequent step S87, the battery charge amount administrating means 80 outputs the calculated capacity retention component Vdc and the estimated DOD to the alternator command value calculating means 90.

Figure 7:
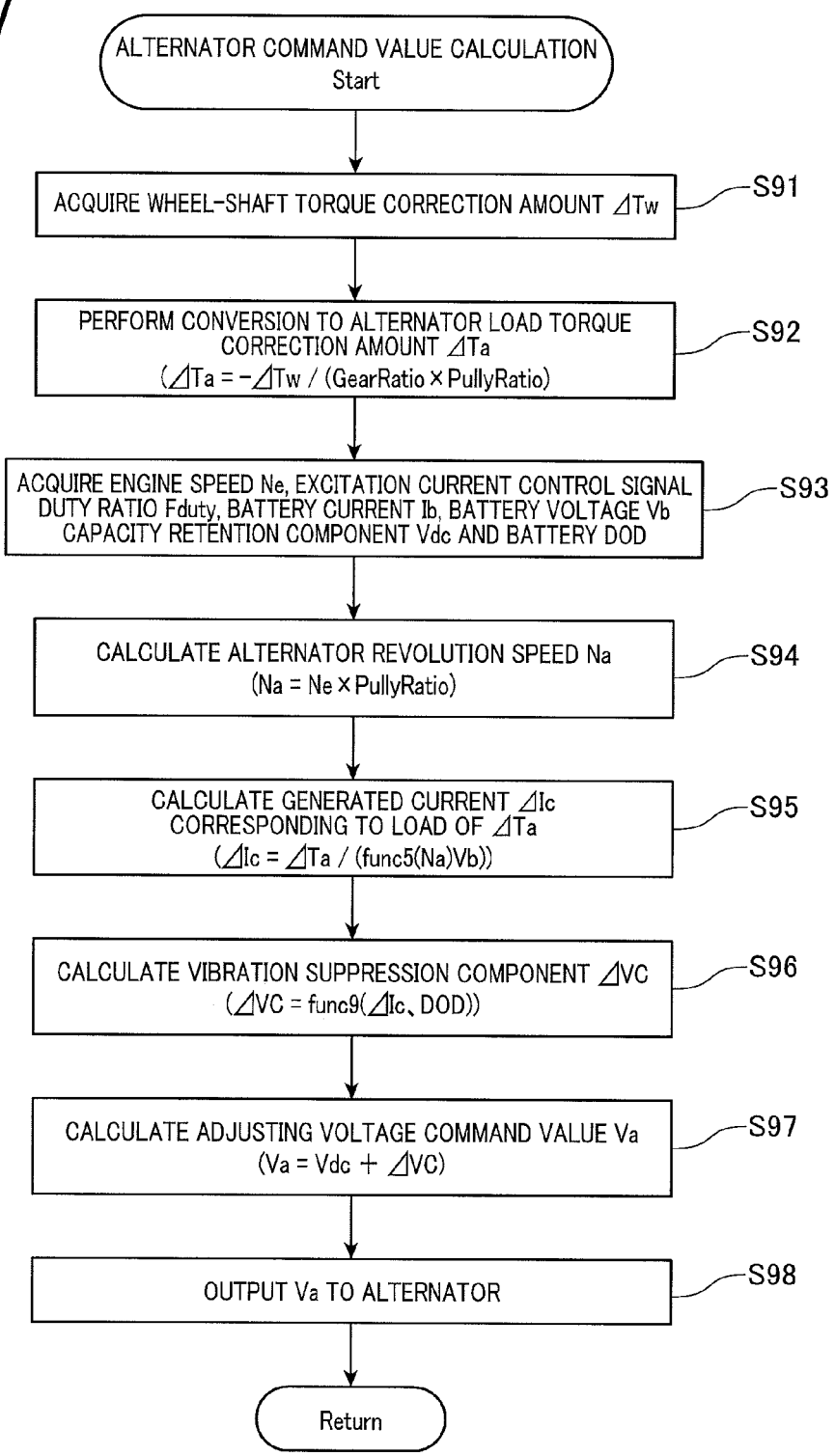
FIG. 7 is a flow chart illustrating a procedure of an arithmetic operation performed by an alternator command value calculating means of FIG. 1.

The alternator command value calculating means 90 repeatedly calculates the adjusting voltage command value Va along a procedure shown in FIG. 7 at the cycle mentioned above. Specifically, in step S91 first, the alternator command value calculating means 90 acquires the wheel-shaft torque correction amount ΔTw mentioned above. In subsequent step S92, the alternator command value calculating means 90 converts the wheel-shaft torque correction amount ΔTw to an alternator load torque correction amount ΔTa. Specifically, the alternator command value calculating means 90 calculates the alternator load torque correction amount ΔTa by dividing the wheel-shaft torque correction amount ΔTw by the gear ratio covering from the crank shaft to the wheel shaft including the differential gear, and the pulley ratio of the rotary shaft of the alternator 20 and the crank shaft.

In subsequent step S93, the alternator command value calculating means 90 acquires the engine speed Ne, the field current duty value Fduty, the battery current Ib and the battery voltage Vb via the communication bus line 14, while also acquiring the capacity retention component Vdc and DOD mentioned above. In subsequent step S94, the alternator command value calculating means 90 calculates the alternator revolution speed Na by multiplying the pulley ratio with the acquired engine speed Ne.

In subsequent step S95, the alternator command value calculating means 90 calculates a generated current ΔIc of the alternator 20, which corresponds to the converted alternator load torque correction amount ΔTa. Specifically, the alternator command value calculating means 90 calculates the generated current ΔIc according to an inverse function of the function func5 shown in FIG. 3 on the basis of the alternator load torque correction amount ΔTa, the battery voltage Vb and the alternator revolution speed Na.

In subsequent step S96, the alternator command value calculating means 90 calculates the vibration suppression component ΔVC according to a function func9, on the basis of the calculated generated current ΔIc and the acquired DOD. It should be noted that, on the premise that the generated current ΔIc is all accepted by the battery 30, a voltage variation component for passing the generated current ΔIc to the battery 30 is rendered to be the vibration suppression component ΔVC for motion control.

A specific example of the function func9 is explained. Using a map to which the generated current ΔIc and DOD are inputted, a voltage variation corresponding to the generated current ΔIc is calculated as the vibration suppression component ΔVC. It should be noted that, since the characteristics of the map vary between charge and discharge of the battery 30, charge or discharge is determined from the sign of the generated current ΔIc, and the vibration suppression component ΔVC is corrected depending on charge or discharge. Alternatively, a map for charge and a map for discharge may both be prepared and stored, and the vibration suppression component ΔVC may be calculated using a suitable map.

In subsequent step S97, the alternator command value calculating means 90 adds the acquired capacity retention component Vdc to the calculated vibration suppression component ΔVC to calculate the adjusting voltage command value Va. In subsequent step S98, the alternator command value calculating means 90 outputs the calculated adjusting voltage command value Va to the regulator 21. The regulator 21 duty-controls the field current so that the generated voltage of the alternator 20 conforms to the adjusting voltage command value Va.

Figure 8:
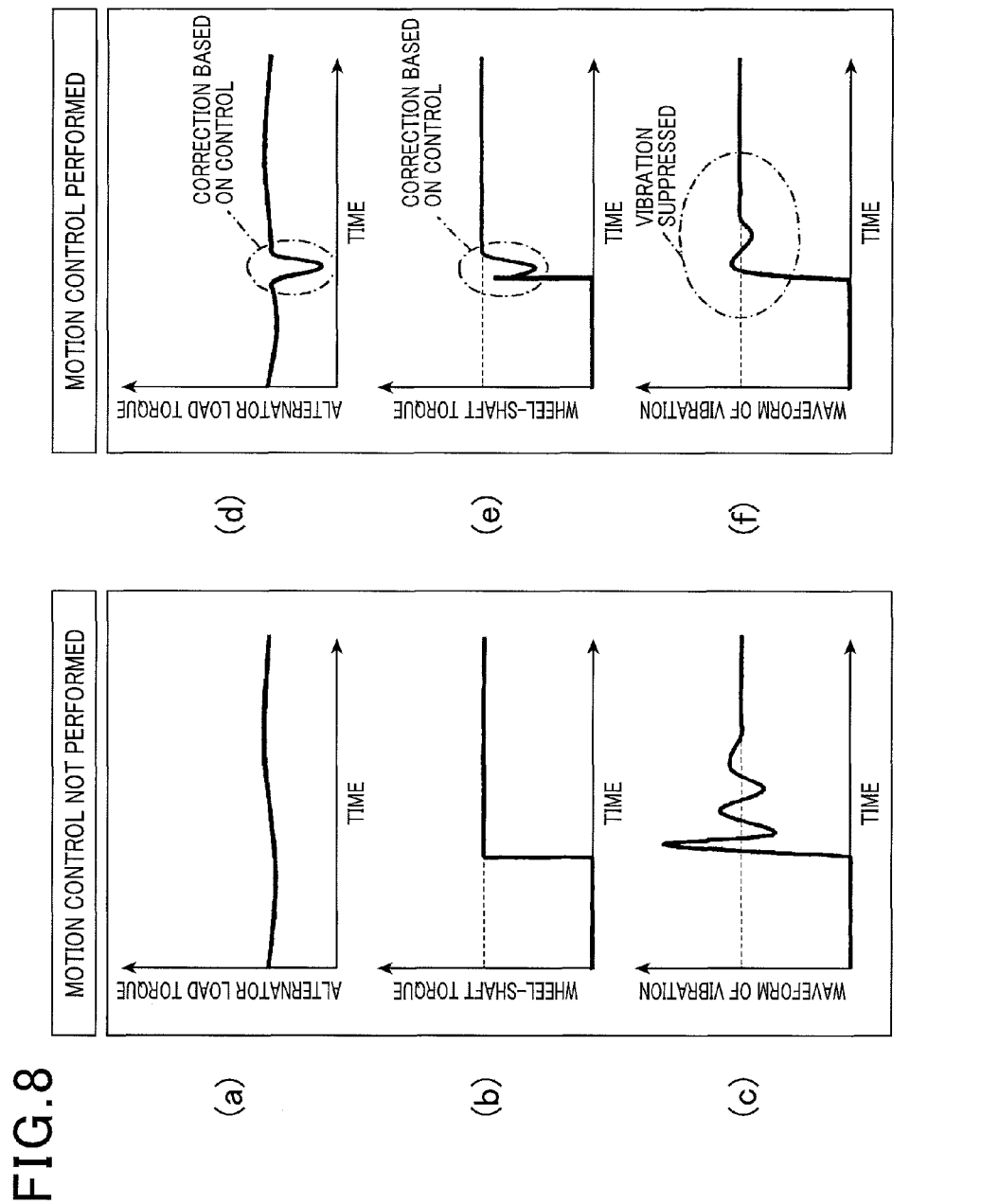
FIG. 8 is a diagram explaining comparison between a case where vibration damping control of vehicle vibration (motion control) is performed and a case where not performed.

Referring to FIG. 8, hereinafter is described a comparison between a case where vibration damping control (motion control) of the vehicle vibration is conducted by driving the alternator 20, taking account of the wheel-shaft torque correction amount ΔTw, and a case where the motion control has not been conducted.

For example, when a vehicle driver depresses the accelerator pedal, in the absence of the motion control, the wheel-shaft torque increases in accordance with the accelerator position Acc (see FIG. 8 (b)) and, with the increase of the torque, vehicle vibration occurs (see FIG. 8 (c)). The vehicle vibration refers to various vibrations, such as a vertical pitching motion of the vehicle and back-and-forth chassis motion. It should be noted that the alternator load torque in this case exhibits a waveform of variation in accordance with the power consumption torque and the capacity retention torque (see FIG. 8 (a)).

In contrast, the alternator load torque in the case where motion control is performed exhibits a waveform of variation in accordance with the vehicle-shaft torque correction amount ΔTw, the power consumption torque and the capacity retention torque (see FIG. 8 (d)). In other words, immediately after the accelerator pedal is depressed, the arithmetic unit estimates vehicle vibration, while, concurrently, calculating a correction torque for suppressing (damping) the vibration and correcting the load torque of the alternator (see FIG. 8 (*e*)). As a result, the vehicle vibration is suppressed (see FIG. 8 (*f*)).

The vibration waveforms shown in FIGS. 8(*c*) and 8(*f*) each have a shape resulting from the superposition of a pulsation component on a major component that increases stepwise. For example, when braking is applied, the vehicle speed decreases in a state where the vehicle body is tilted forward, but in an accelerated run, the vehicle speed increases in a state where the vehicle body is tilted rearward. The vehicle behavior of the forward tilting or the rearward tilting corresponds to the vibration of the "major component", while the vehicle behavior of pitching vibration and pulsation of the vehicle body in forward or rearward tilting corresponds to the vibration of the "pulsation component".

An object of vibration suppression by correction torque is the pulsation component, but the major component is not regarded to be an object of vibration suppression. Accordingly, the vibration waveform shown in FIG. 8 (*f*) in a case of performing the motion control using the correction torque includes the major component, as it is, with the pulsation component being suppressed, compared to the waveform of (*c*) that has not been subjected to motion control. FIG. 8 (*c*) shows the pulsation component having higher frequency than that of the major component. However, the pulsation component having lower frequency than that of the major component may also be an object of vibration suppression by correction torque.

Note that, in steps S72 and S73 described above, the vibration of the vehicle is reproduced on a computer using a plant model, and the wheel-shaft torque correction amount ΔTw is calculated so as to damp the vibration. The power consumption torque ΔTdc shown in FIG. 9 (*b*) has frequency which is set to be lower than a lowest one of the frequency components of the wheel-shaft torque correction amount ΔTw shown in FIG. 9 (*c*).

The load torque of the alternator 20 includes the wheel-shaft torque correction amount ΔTw under motion control for suppressing vehicle vibration (see FIG. 9 (*c*)), the power consumption torque (see FIG. 9 (*d*)) and the capacity retention torque required for retaining the battery capacity within the allowable control range as discussed later. As described above, a command value of the adjusting voltage Va is determined by superposing the vibration suppression component ΔVC having frequency of not less than that of the vehicle vibration, on the capacity retention component Vdc having frequency lower than that of the vehicle vibration. In other words, the frequency of the capacity retention torque consumed for generation is set to be lower than that of the wheel-shaft torque correction amount ΔTw. Accordingly, the waveform of the wheel-shaft torque correction amount ΔTw shown in FIG. 9 (*c*) does not interfere with the wave form of the capacity retention torque.

Figure 9:
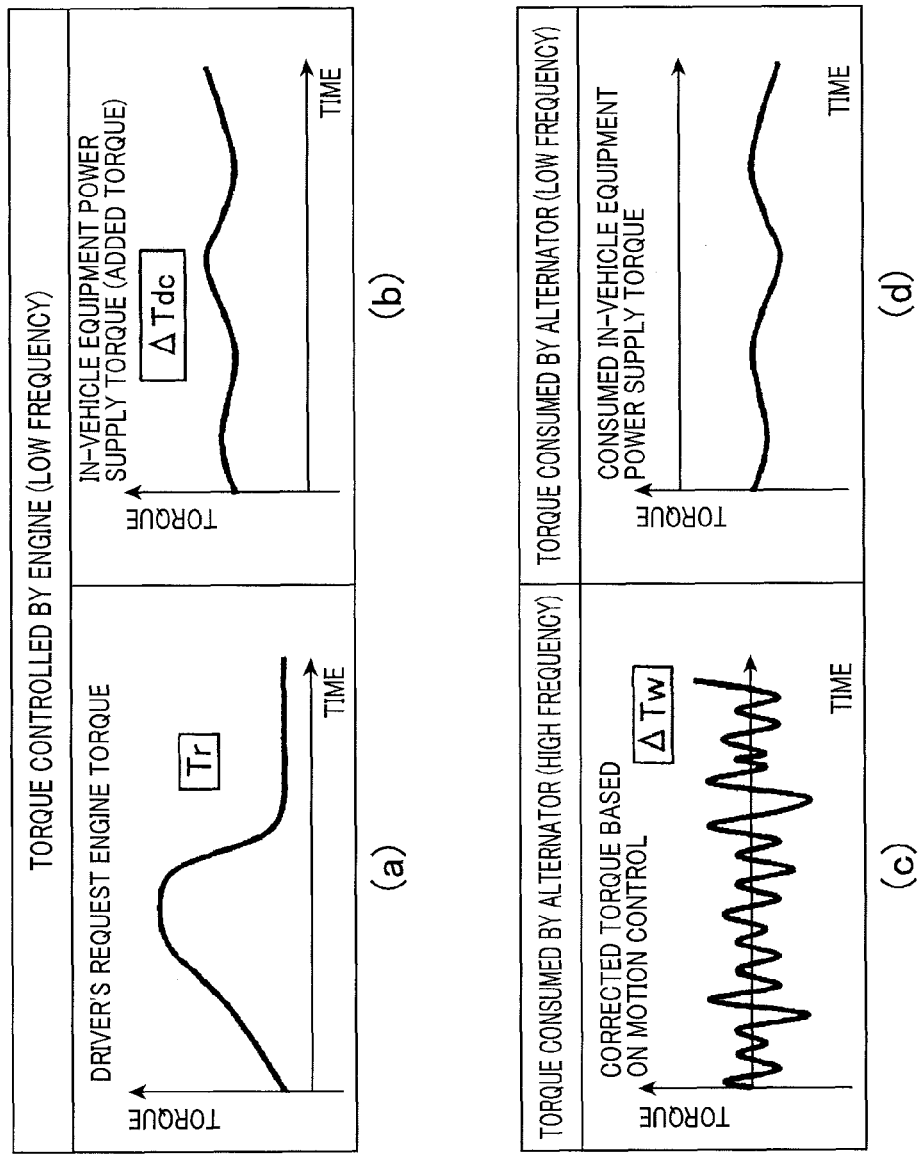
FIG. 9 is a diagram illustrating waveforms of a driver's request engine torque Tr, a consumed power torque ΔTdc and a wheel-shaft torque correction amount ΔTw.

Further, the waveform of alternator power consumption torque shown in FIG. 9 (*d*) is set so as to have frequency lower than that of the wheel-shaft torque correction amount ΔTw. The alternator power consumption torque component is included, as the power consumption torque ΔTdc of the engine mentioned above, in the driver's request engine torque Tr to increase the engine output. In other words, the engine command value is set such that the waveform of the alternator power consumption torque shown in FIG. 9 (*d*) and the waveform of the power consumption torque ΔTdc of the engine shown in FIG. 9 (*b*) are cancelled with each other. It should be noted that, when the capacity retention torque of the alternator causes no problem in the running performance, there is no problem if processing is performed on the basis of ΔTdc=0.

As described above, according to the present embodiment, the generation amount of the alternator 20 is varied in conformity with the vehicle vibration to thereby suppress the vehicle vibration by the drive torque of the alternator 20. The variation in this way of the generation amount of the alternator 20 is realized by varying the adjusting voltage command value Va. This can dispense with the "novel device for directly controlling an output current" that has been indispensable in the conventional art. Thus, vibration suppression can be realized by only varying the adjusting voltage command value Va by the existing ECU 13.

Further, according to the present embodiment, the following advantages are also provided.

In calculating the adjusting voltage command value Va, the capacity retention component Vdc is calculated by the battery charge amount administrating means 80, while the vibration suppression component ΔVC is calculated by the wheel-shaft torque correction amount calculating means 70 and the alternator command value calculating means 90. Thus, since the adjusting voltage command value Va is calculated by adding these calculated values Vdc and ΔVC, calculation of the adjusting voltage command Va can be easily realized. It should be noted that the battery charge amount administrating means 80 corresponds to the capacity retention component calculating means, and the wheel-shaft torque correction amount calculating means 70 and the alternator command value calculating means 90 correspond to the vibration suppression component calculating means.

In calculating the vibration suppression component ΔVc corresponding to the generated current ΔIc in step S96, the correlation between ΔIc and ΔVc depends on the residual capacity of the battery. In view of this point in the present embodiment, the vibration suppression component ΔVc corresponding to the generated current ΔIc is calculated taking account of DOD, and thus the vibration suppression component ΔVc can be calculated with high accuracy. Accordingly, vehicle vibration can be suppressed with excellent accuracy.

In calculating the vibration suppression component ΔVc corresponding to the generated current ΔIc in step S96, the correlation between ΔIc and ΔVc is different between a charge state and a discharge state. In view of this point in the present embodiment, the vibration suppression component ΔVc corresponding to the generated current ΔIc is calculated taking account of whether the state is charge or discharge, and thus the vibration suppression component ΔVc can be calculated with high accuracy. Accordingly, vehicle vibration can be suppressed with excellent accuracy. In other words, in step S96, the vibration suppression component ΔVc is calculated, taking account of battery characteristics.

In calculating the generated current ΔIc corresponding to the alternator load torque correction amount ΔTa in step S95, the correlation between ΔTa and ΔIc depends on the alternator revolution speed Na. In view of this point in the present embodiment, the generated current ΔIc corresponding to the alternator load torque correction amount ΔTa is calculated, taking account of the alternator revolution speed Na. Accordingly, the generated current ΔIc can be calculated with high accuracy, and further, the vibration suppression component ΔVC can be calculated with high accuracy. Thus, vehicle vibration can be suppressed with excellent accuracy.

The frequency of the power consumption torque ΔTdc is set to be lower than at least a lowest one of the frequency components of the wheel-shaft torque correction amount ΔTw shown in FIG. 9 (*c*). Accordingly, in the engine torque, interference is prevented between the waveform of the torque corresponding to the generation component of the power consumption torque ΔTdc and the waveform of the torque corresponding to the generation component of the wheel-shaft torque correction amount ΔTw. In this way, interference is avoided between the function of power supply to the in-vehicle equipment 31 by the power consumption torque ΔTdc and the function of vibration suppression by the wheel-shaft torque correction amount ΔTw to thereby avoid functional deterioration.

The upper limit of the battery capacity (i.e. the lower limit Th2 of DOD) is set to a value smaller than that of a full charge, so that the generated power component corresponding to the vibration suppression component ΔVC can be accepted by the battery 30. Accordingly, the energy of an engine output component corresponding to the vibration suppression component ΔVC is recovered as charge energy for the battery 30. Thus, fuel efficiency is prevented from being impaired due to the motion control for vibration suppression.

Other Embodiments

The present invention is not limited to the description of the foregoing embodiment, but may be modified and implemented as follows. Further, the configurations that are characteristics of individual embodiments may be optionally combined.

In the example shown in FIG. 1, the ECU 13 performs various calculations using six calculating means 40 to 90 to output an engine command value and the adjusting voltage command value Va as final calculation results. However, the present invention is not limited to the calculations performed by the six calculating means 40 to 90. As far as the engine command value and the adjusting voltage command value Va are calculated on the basis of the various inputs (e.g., Acc, Ne, Fduty, Ib and Vb) provided to the ECU 13, the calculations of the intermediate values (e.g., ΔTdc, Tr, Tw, ΔTw, Vdc and DOD) used for the calculations of both command values may be omitted as appropriate.

The foregoing embodiment exemplifies the contents of the functions func1 to func8. However, the contents are not limited to the exemplified ones, but any process may be used as far as the equivalent results are obtained.

In the foregoing embodiment, DOD (depth of discharge) is used as a parameter expressing the residual capacity of the battery, but SOC (state of charge) may be used instead. It should be appreciated that, since DOD and SOC each express a unit in terms of percentage and have a relationship indicated by Formula (a), they can be easily replaced with each other.

$$SOC[\%]=100[\%]-DOD[\%] \quad (a)$$

In the foregoing embodiment, the engine command value calculating means 60 calculates three command values (throttle position, fuel injection quantity, and ignition timing) as engine command values. Alternatively, any one or two of them may be ensured to be calculated.

With reference to the drawings, hereinafter is described another embodiment of a vehicle motion control apparatus according to the present invention.

In the present embodiment, the motion control performed by the vehicle motion control apparatus is vibration damping of various vibrations caused in the vehicle due to variation in the wheel-shaft torque. Further, the vibrations which are objects of vibration damping include a vibration of the vehicle body (1 to 5 Hz), an engine-mounting system vibration (7 to 15 Hz), and a vibration of the chassis or the tires (not less than 10 Hz).

<General Configuration>

Figure 10:
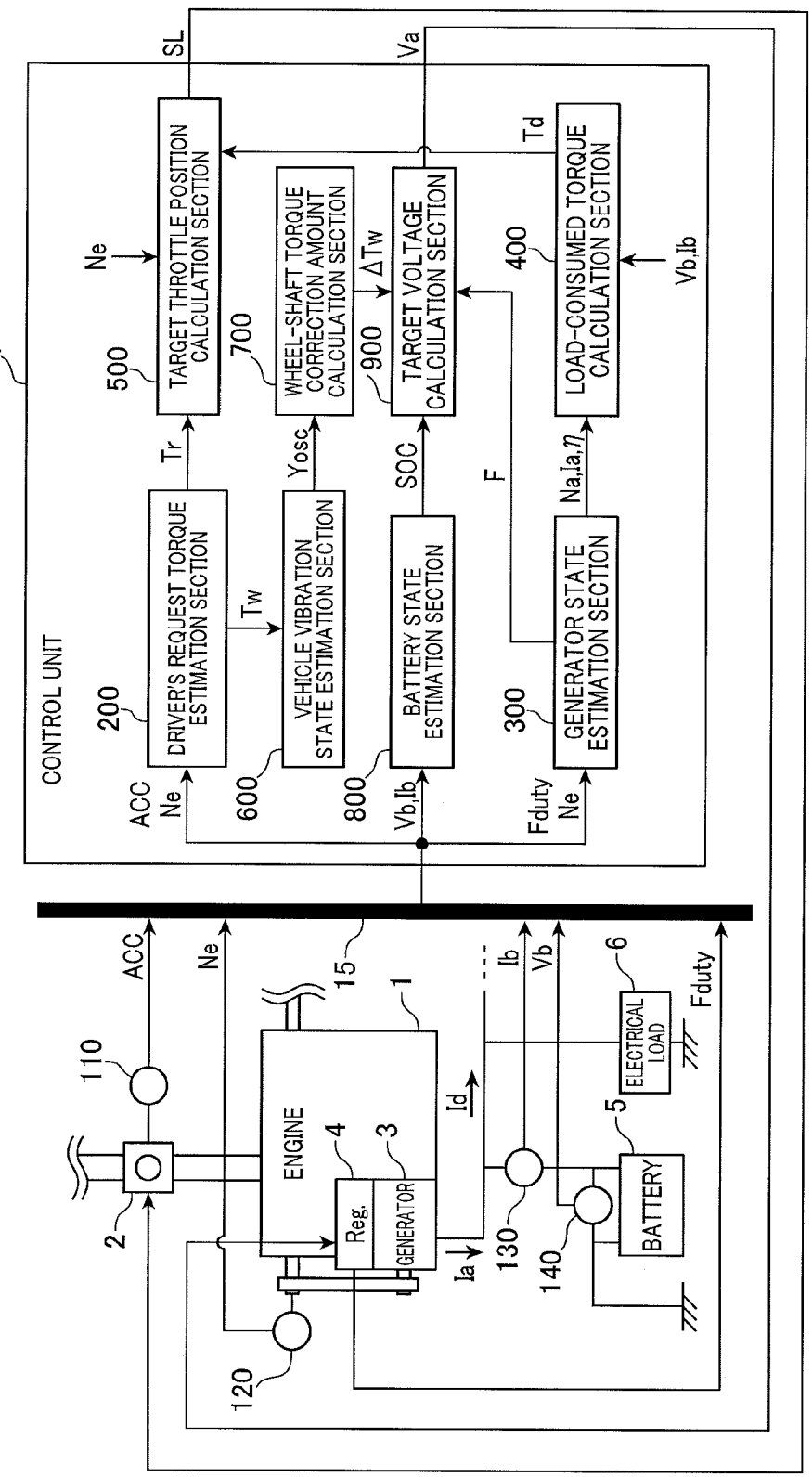
FIG. 10 is a block diagram illustrating a vehicle motion control apparatus according to an embodiment of the present invention.

As shown in FIG. 10, a vehicle to which the vehicle motion control apparatus is applied includes: an engine used for running (internal combustion engine) 1; an electric throttle valve 2 that controls an intake air quantity for the engine 1 according to a command value (target throttle position SL); a generator 3 rotatably driven by the engine 1; a voltage regulator 4 that duty-controls a field current passing through an excitation winding of the generator 3 according to a command value (target voltage Va), so that the generated voltage of the generator 3 conforms to a target voltage Va; a battery 5 that charges the generated power of the generator 3; an electrical load 6 that is driven by the generated power of the generator 3 or the charged power of the battery 5; and a control unit (ECU) 7 that generates command values (target throttle position SL and target voltage Va) for the electric throttle valve 2 and the voltage regulator 4 to control the operations of the engine 1 and the generator 3.

Further, the vehicle includes: an accelerator stroke sensor 110 that outputs a signal used for calculating a manipulated variable of depressing an accelerator pedal which is manipulated by the vehicle's driver (accelerator position Acc); a crank rotation angle sensor 120 that outputs a signal used for calculating the number of revolutions (engine speed) Ne of a crank shaft per predetermined time period; a battery current sensor 130 that outputs a detection value of a terminal current (battery current) Ib of the battery 5; and a battery voltage sensor 140 that outputs a detection value of a voltage across the terminals (battery voltage Vb) of the battery 5. It should be noted that the sign of the battery current Ib changes depending on the direction in which the current flows, the sign specifying whichever of charge current (plus in the present embodiment) and discharge current (minus in the present embodiment).

Further, the vehicle includes a communicating means 15 which is configured such as by an in-vehicle local area network (LAN) and individual communication lines, and has communication speed sufficient enough for control. In addition, the detection values of the sensors 11 to 14 and a duty value Fduty of the field current set by the voltage regulator 4 are provided to the control unit 7 via the communicating means 15. At the same time, the command values SL and Va generated by the control unit 7 on the basis of these detection values are supplied to the electric throttle valve 2 and the voltage regulator 4 via the communicating means 15.

Figure 31:
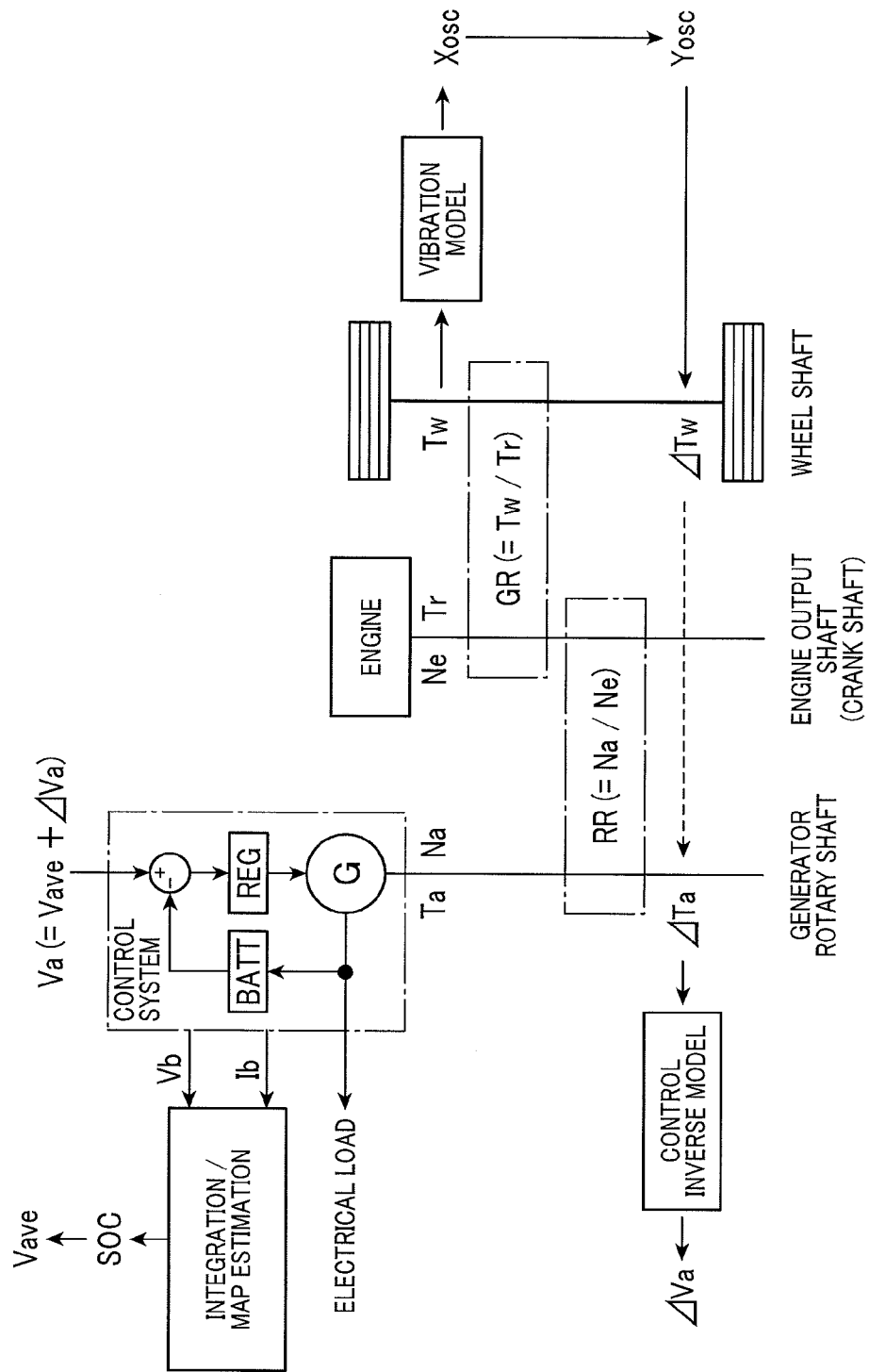
FIG. 31 is an explanatory diagram illustrating a relationship between major parameters.

Hereinafter, the gear ratio of the crank shaft of the engine 1 (engine output shaft) and the rotary shaft of the generator 3 (generator rotary shaft) is referred to as engine-generator gear ratio RR (fixed value). The gear ratio covering from the crank shaft to the wheel shaft including the differential gear is hereinafter referred to as engine-wheel shaft gear ratio GR (RevRatio) (see FIG. 31). The engine-wheel shaft gear ratio GR varies according to the state of the transmission. Accordingly, the control unit 7 acquires information for specifying the gear ratio GR from an ECU that determines the state of the transmission, if the own vehicle is an automatic vehicle, or from a sensor or the like that detects the position of the shift lever, if the own vehicle is a manual vehicle (not shown).

<Voltage Regulator>

The voltage regulator 4 is a well-known one that duty-controls the field current that flows through excitation windings of the generator 3, according to the command value Va supplied from the ECU 7, so that the generated voltage of the generator 3 conforms to the command value Va.

Specifically, when the generated voltage (corresponding to the sum of the battery voltage Vb and a voltage drop component ΔVd caused by conductor wire resistance) is lower than the target voltage Va, the duty value Fduty of the field current is raised to increase the field current. Thus, the generation amount increases to thereby raise the generated voltage. On the other hand, when the generated voltage is higher than the target voltage Va, the duty value Fduty of the field current is lowered to decrease the field current. Thus, the generation amount decreases to lower the generated voltage.

The operation of the voltage regulator 4 in this way contributes to retaining the generated voltage at the target voltage Va even when the number of revolutions of the generator 3 per predetermined time period (generator revolution speed Na) varies according to the variation of the engine speed Ne.

<ECU>

The ECU 7 includes: a driver's request torque estimation section 200 that calculates a driver's request engine output-shaft torque Tr and a driver's request wheel-shaft torque Tw on the basis of the accelerator position Acc and the engine speed Ne; a generator-state estimation section 300 that estimates information regarding the generator 3, which information is not directly obtained from the sensors 11 to 14, on the basis of the duty value Fduty of the field current supplied from the voltage regulator 4 and the engine speed Ne, while determining whether or not the generator 3 is in a state of being used for motion control; a load-consumed torque calculation section 400 that calculates a torque (load-consumed torque) Td for supplying electric power to the electrical load 6 (various pieces of in-vehicle equipment that consumes electric power); and a target throttle position calculation section 500 that calculates a target throttle position SL on the basis of the load-consumed torque Td.

Further, the ECU 7 includes: a vehicle vibration state estimation section 600 that estimates a vibration state Yosc of a vibration which is a target of vibration damping, from among the vibrations in various parts of the vehicle body caused when the driver's request wheel-shaft torque Tw is actually inputted; a wheel-shaft torque correction amount calculation section 700 that calculates the wheel-shaft torque correction amount ΔTw that is a controlled variable for suppressing vehicle vibration, on the basis of the estimated vibration state Yosc; a battery state estimation section 800 that calculates SOC (state of charge) as a battery state quantity expressing the charge state of the battery 5; and a target voltage calculation section 900 that calculates the target voltage Va on the basis of the wheel-shaft torque correction amount ΔTw and SOC.

Note that the ECU 7 is mainly configured by a well-known microcomputer. The sections 200 to 900 show, on a function-basis, the processes performed by the microcomputer. With these functions, the target throttle position SV and the target voltage Va are repeatedly calculated.

Hereinafter, the processes performed by the sections 200 to 900 configuring the ECU 7 are individually explained.

<Driver's Request Torque Estimation Section>

Figure 11:
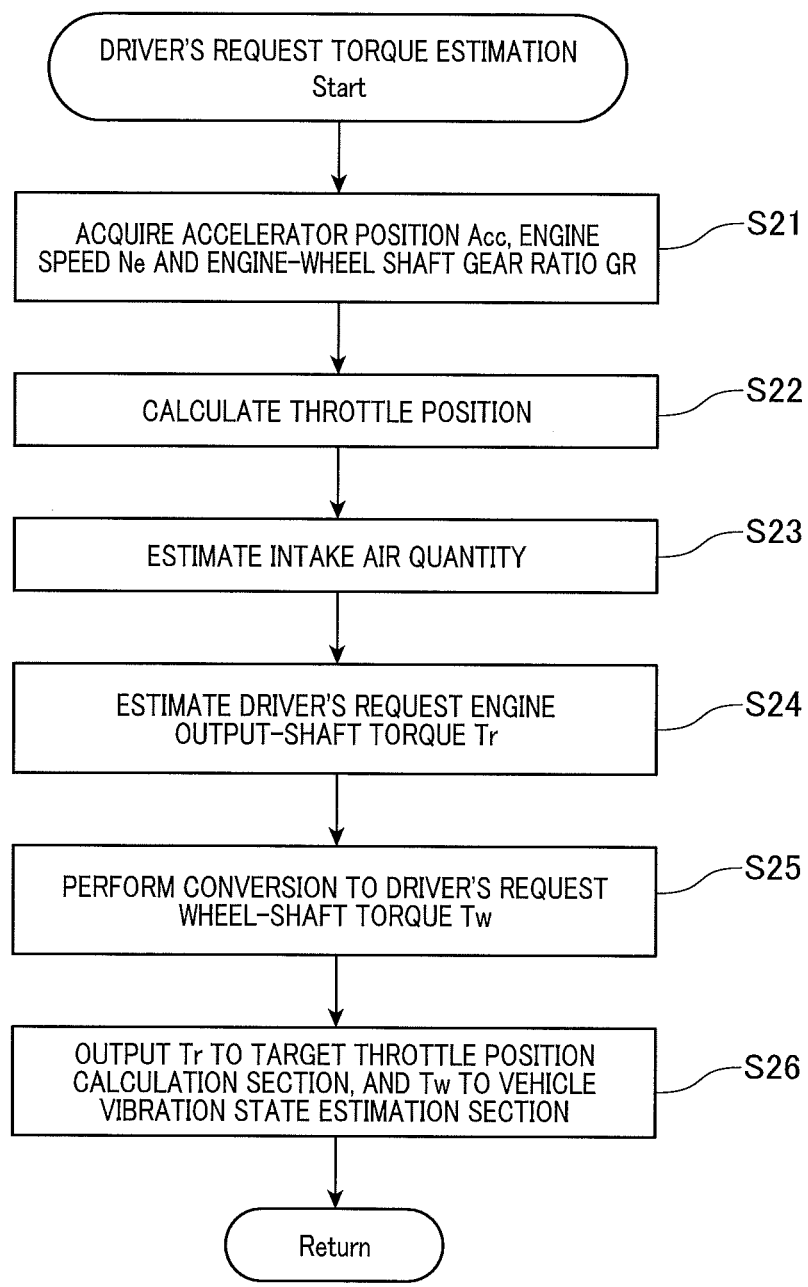
FIG. 11 is a flow chart illustrating a procedure of an arithmetic operation performed by a driver's request torque estimation section.

The driver's request torque estimation section 200 repeatedly performs a procedure shown in FIG. 11 at a predetermined cycle to repeatedly calculate the driver's request engine output-shaft torque Tr and the driver's request wheel-shaft torque Tw.

First, in step (hereinafter simply indicated as "S") 21, the driver's request torque estimation section 200 acquires the accelerator position Acc and the engine speed Ne detected such as by sensors, and the engine-wheel shaft gear ratio GR.

In subsequent S22, the driver's request torque estimation section 200 calculates a throttle position from the acquired accelerator position Acc. In subsequent S23, the driver's request torque estimation section 200 estimates an intake air quantity from the calculated throttle position and the acquired engine speed Ne. In subsequent S24, the driver's request torque estimation section 200 estimates the driver's request engine output-shaft torque Tr from the estimated intake air quantity. It should be noted that, in the processes of these S22 to S24, the estimation is made using various maps prepared in advance (stored in a memory). However, since these processes are known, a detailed explanation is omitted.

In subsequent S25, the driver's request torque estimation section 200 converts the driver's request engine output-shaft torque Tr to the wheel-shaft torque Tw using the engine-wheel shaft gear ratio GR, according to Formula (1).

[Math. 1]

$$Tw = Tr \times GR \tag{1}$$

In subsequent S26, the driver's request torque estimation section 200 outputs the driver's request engine output-shaft torque Tr to the target throttle position calculation section 500 and, at the same time, outputs the driver's request wheel-shaft torque Tw to the vehicle vibration state estimation section 600, followed by terminating the present procedure.

<Generator State Estimation Section>

Figure 12:
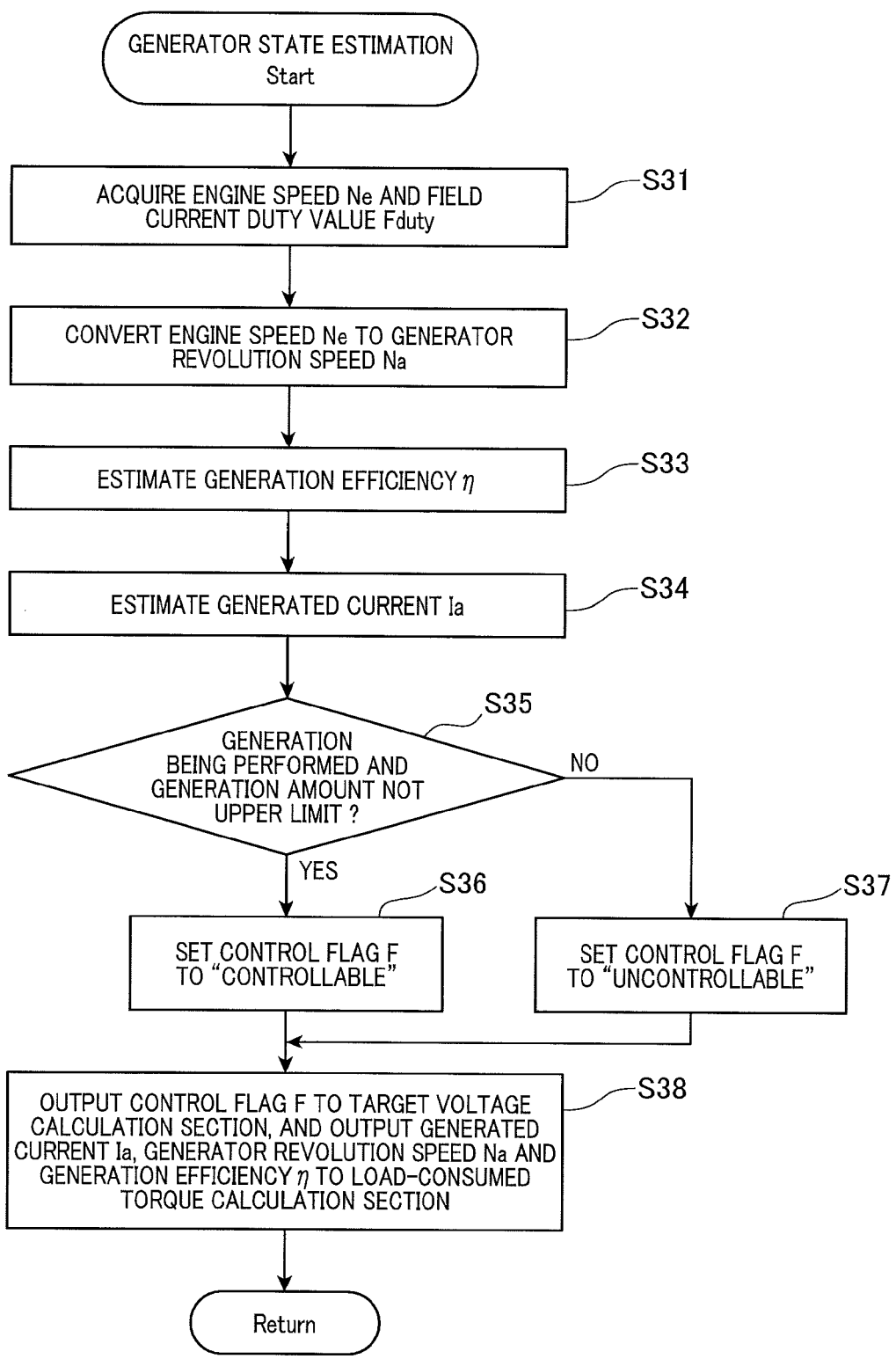
FIG. 12 is a flow chart illustrating a procedure of an arithmetic operation performed by a generation state estimation section.

The generator state estimation section 300 repeatedly performs a procedure shown in FIG. 12 at a predetermined cycle to generate various pieces of information required for the processings in the load-consumed torque calculation section 400 and the target voltage calculation section 900.

First, in S31, the generator state estimation section 300 acquires the engine speed Ne detected such as by a sensor, and the field current duty value Fduty.

In subsequent S32, the generator state estimation section 300 converts the engine speed Ne to the generator revolution speed Na using the engine-generator gear ratio RR, according to Formula (2).

[Math. 2]

$$Na = Ne \times RR \tag{2}$$

In subsequent S33, the generator state estimation section 300 uses a generation efficiency map prepared in advance to estimate a generation efficiency η, on the basis of the calculated generator revolution speed Na.

As shown in FIG. 4 (a), the generation efficiency map shows an experiment-based relationship between the generator revolution speed Na and the generation efficiency η. It should be noted that the generation efficiency η corresponds to a ratio of generated power [W] to motive power [W] supplied to the generator 3 from the engine 1.

In subsequent S34, the generator state estimation section 300 estimates a generated current Ia using a generated current map prepared in advance, on the basis of the generator revolution speed Na calculated in S32 and the field current duty value Fduty acquired in S31.

As shown in FIG. 13 by (b), the generated current estimation map shows an experiment-based relationship between the generator revolution speed Na and the generated current Ia (Na–Ia characteristics). The relationship is shown for each field current duty value Fduty.

The generated current Ia herein is estimated from the generator revolution speed Na. However, when a current sensor for measuring the generated current Ia is provided, the measured value may be used.

Subsequently, the generator state estimation section 300 determines whether or not the generator 3 is in the midst of generation and the generation amount is less than an upper limit. If an affirmative determination is made, the control proceeds to S36. If a negative determination is made, the control proceeds to S37.

The determination as to whether or not the generator is in the midst of generation is specifically made on the basis of whether or not the generator revolution speed Na (and therefore the engine speed Ne) has reached the number of revolutions with which the generated current Ia starts flowing (generation determination threshold) (see FIG. 13 (b)). Further, the determination as to whether or not the generation amount has reached the upper limit is made by determining whether or not the field current duty value Fduty has reached an upper limit determination threshold (e.g., 100%).

In S36, a control flag F is set to a value that indicates "controllable" (F←1 herein). The control flag F indicates whether or not the generation amount of the generator 3 can be varied in order to generate wheel-shaft drive torque for use in motion control (vibration damping control).

In S37, the generator state estimation section 300 sets the control flag F to a value that indicates "uncontrollable" (F0←herein).

In subsequent S38, the generator state estimation section 300 outputs the control flag F to the target voltage calculation section 900, while outputting the generation efficiency η, the generated current Ia and the generator revolution speed Na to the load-consumed torque calculation section 400, followed by terminating the present procedure.

<Load-Consumed Torque Calculation Section>

Figure 14:
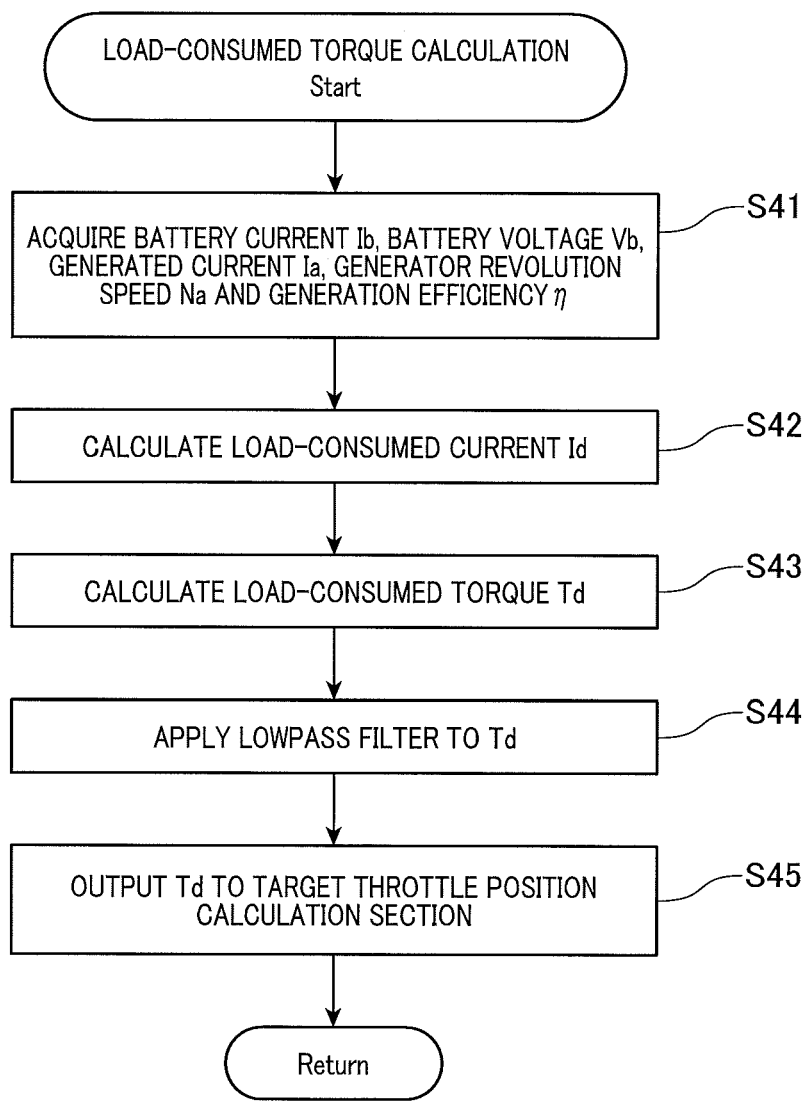
FIG. 14 is a flow chart illustrating a procedure of an arithmetic operation performed by a load-consumed torque calculation section.

The load-consumed torque calculation section 400 repeatedly performs a procedure shown in FIG. 14 at a predetermined cycle to repeatedly calculate a torque for supplying electric power to the electrical load 6 (load-consumed torque Td).

First, in S41, the load-consumed torque calculation section 400 acquires the battery current Ib, and the battery voltage Vb detected such as by sensors, while acquiring the generated current Ia, the generator revolution speed Na and the generation efficiency η estimated by the generator state estimation section 300.

In subsequent S42, the load-consumed torque calculation section 400 subtracts the acquired battery current Ib from the generated current Ia to calculate a load-consumed current Id (=Ia−Ib) that flows to the electrical load (in-vehicle equipment or the like) 6.

In subsequent step S43, the load-consumed torque calculation section 400 calculates the load-consumed torque Td that is a torque of the engine output shaft, which is required for allowing the generator 3 to generate the load-consumed current Id. The calculation is performed according to Formula (3), on the basis of the calculated load-consumed current Id, the battery voltage Vb, the generator revolution speed Na, the generation efficiency η and the engine-generator gear ratio RR.

[Math. 3]

$$Td = \frac{RR \times Vb \times Id}{\eta \times \frac{2\pi \cdot Na}{60}} \quad (3)$$

In subsequent S44, the load-consumed torque calculation section 400 applies a lowpass filter to the calculated load-consumed torque Td. The filter has cutoff frequency which is set to a sufficiently low value (less than 1 Hz) compared to the frequency band of an object vibration that is an object of motion control (vibration damping control).

In subsequent S45, the load-consumed torque calculation section 400 outputs the calculated load-consumed torque Td to the target throttle position calculation section 500, followed by terminating the present procedure.

<Target Throttle Position Calculation Section>

Figure 15:
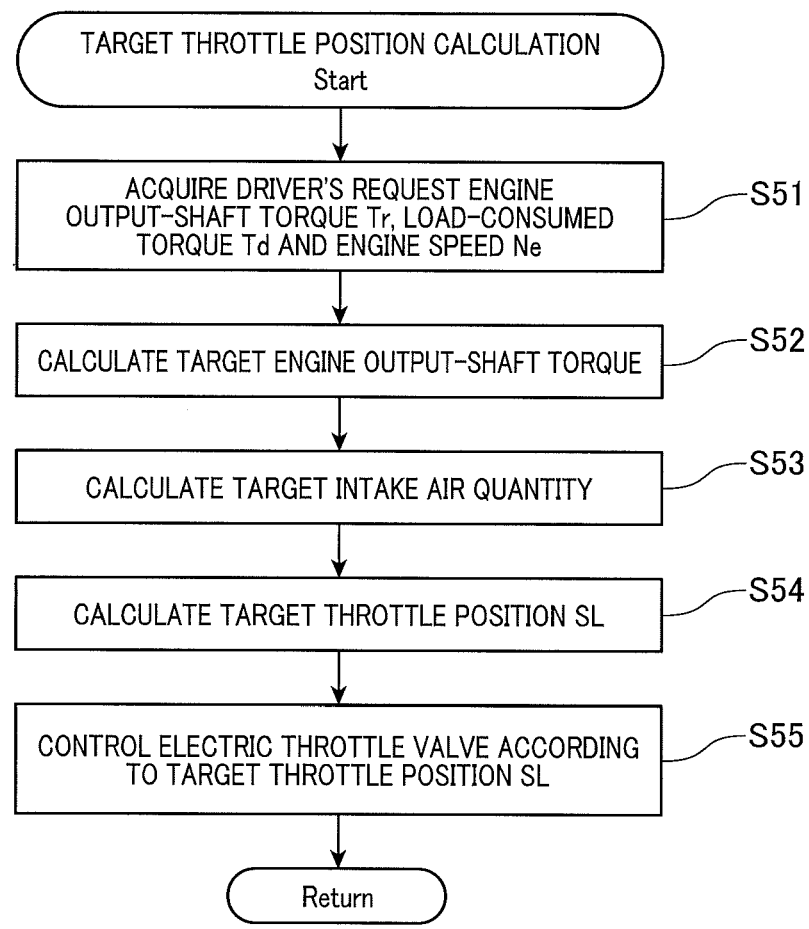
FIG. 15 is a flow chart illustrating a procedure of an arithmetic operation performed by a target throttle position calculation section.

The target throttle position calculation section 500 repeatedly performs a procedure shown in FIG. 15 at a predetermined cycle to repeatedly calculate a target throttle position SL, and controls the electric throttle valve using a command value that is the calculation result.

First, in S51, the target throttle position calculation section 500 acquires the driver's request engine output-shaft torque Tr estimated by the driver's request torque estimation section 200, the load-consumed torque Td calculated by the load-consumed torque calculation section Td, and the engine speed Ne detected by the sensor.

In subsequent S52, the target throttle position calculation section 500 adds the load-consumed torque Td to the acquired driver's request engine output-shaft torque Tr to calculate a target engine output-shaft torque. In other words, the target engine output-shaft torque corresponds to the driver's acceleration pedal manipulation component which is permitted to include in advance the electrical load-consumed component of the electrical load 6.

In subsequent S53, the target throttle position calculation section 500 calculates a target intake air quantity for realizing the calculated target engine output-shaft torque. In subsequent S54, the target throttle position calculation section 500 calculates the target throttle position SL on the basis of the calculated target intake air quantity.

The target intake air quantity and the target throttle position SL are calculated using various maps prepared in advance. Since these techniques are known, detailed explanations are omitted.

In subsequent S55, the target throttle position calculation section 500 provides the calculated target throttle position SL as a command value to the electric throttle valve 2 via the communicating means 15, followed by terminating the present procedure. As a result, the electric throttle valve 2 is actuated such that the engine 1 generates the target engine output-shaft torque.

<Vehicle Vibration State Estimation Section>

Figure 16:
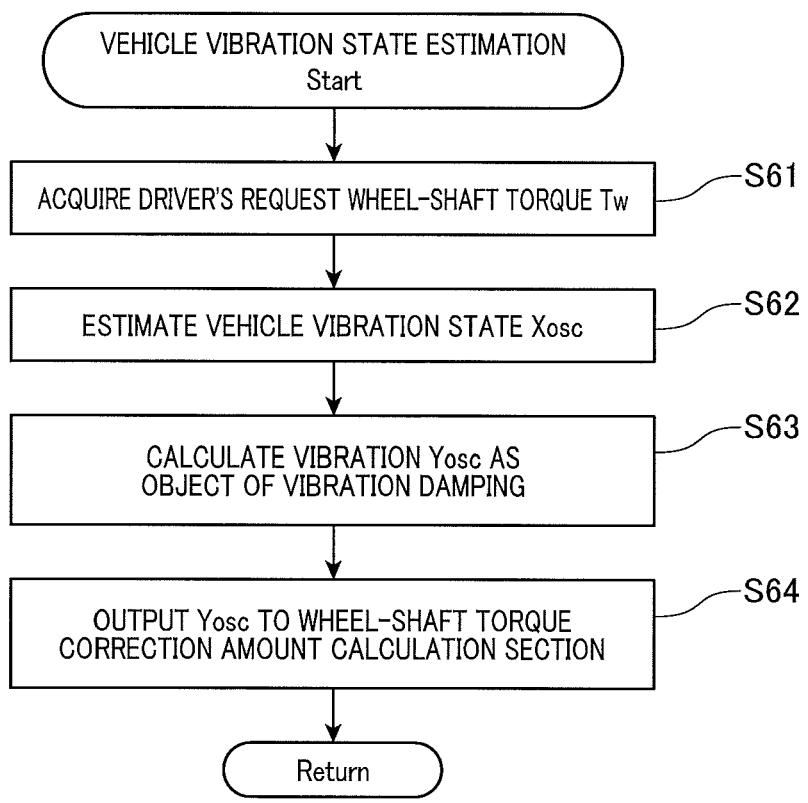
FIG. 16 is a flow chart illustrating a procedure of an arithmetic operation performed by a vehicle vibration state estimation section.

The vehicle vibration state estimation section 600 repeatedly perform a procedure shown in FIG. 16 at a predetermined cycle to repeatedly estimate the vibration state Yosc of an object vibration that is an object of vibration damping.

First, in S61, the vehicle vibration state estimation section 600 acquires the driver's request wheel-shaft torque Tw estimated by the driver's request torque estimation section 200. In subsequent S62, the vehicle vibration state estimation section 600 inputs the acquired driver's request wheel-shaft torque Tw into a vehicle vibration model prepared in advance, for the estimation of a vibration state Xosc caused in individual parts of the vehicle. A specific example of the vehicle vibration model includes, for example, an on-spring vibration model or the like described in JP-A-2006-060936. The vehicle vibration model corresponds to a mechanical relationship in the form of a mathematical expression, the relationship being of the driver's request wheel-shaft torque Tw relative to the vibrations of individual parts of the vehicle, and thus corresponds to a state equation in the field of control engineering.

In subsequent S63, the vehicle vibration state estimation section 600 calculates the vibration state Yosc of the object vibration on the basis of the estimated vehicle vibration state Xosc. The vibration included in the vehicle vibration state Xosc may be directly used as the vibration state Yosc of the object vibration. For example, the vibration state Yosc of the object vibration to be used may be a different vibration which is calculated on the basis of the vehicle vibration state Xosc corresponding such as to variation of a stability factor that is determined by the degree such as of a vehicle-body pitching vibration. The object vibration herein includes vibration of the vehicle body (1 to 5 Hz), engine-mounting system vibration (7 to 15 Hz), or vibration of the chassis or the tires (not less than 10 Hz). Note that the vibration state Yosc of the object vibration is calculated so as to be zero when vibration damping has been achieved. In this way, the process of calculating the vibration state Yosc of an object vibration from the vehicle vibration state Xosc corresponds to an output equation in the field of control engineering.

In subsequent S64, the vehicle vibration state estimation section 600 outputs the vibration state Yosc of the object vibration to the wheel-shaft torque correction amount calculation section 700, followed by terminating the present procedure.

<Wheel-Shaft Torque Correction Amount Calculation Section>

Figure 17:
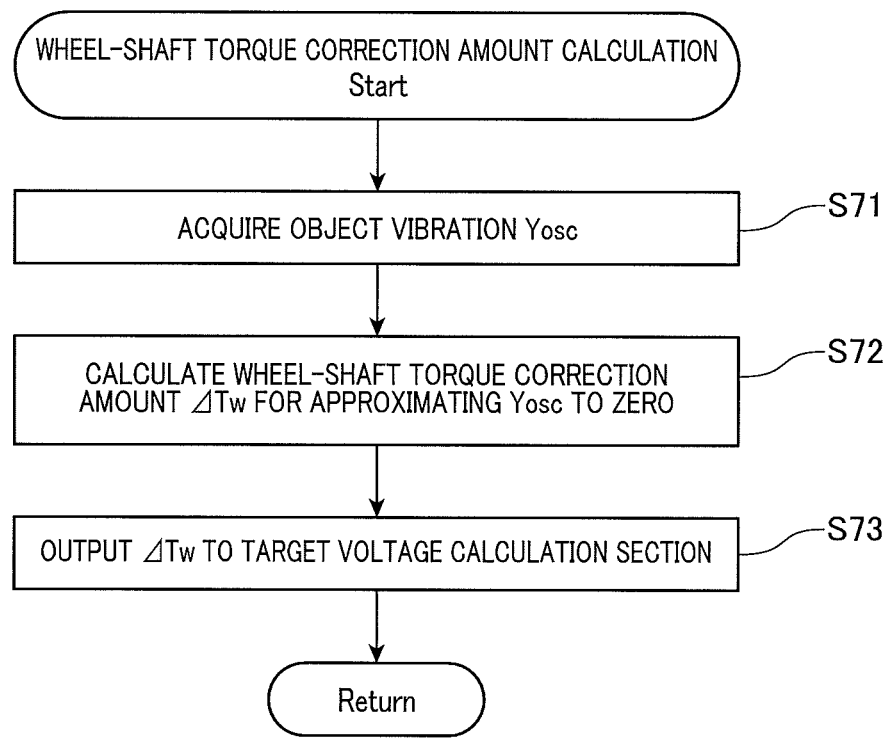
FIG. 17 is a flow chart illustrating a procedure of an arithmetic operation performed by a wheel-shaft torque correction amount calculation section.

The wheel-shaft torque correction amount calculation section 700 repeatedly performs a procedure shown in FIG. 17 every time the vibration state Yosc of an object vibration is calculated to thereby repeatedly calculate the wheel-shaft torque correction amount ΔTw.

First in S71, the wheel-shaft torque correction amount calculation section 700 acquires the vibration state Yosc of the object vibration estimated by the vehicle vibration state estimation section 600.

In subsequent S72, the wheel-shaft torque correction amount calculation section 700 uses the vibration state Yosc of the object vibration as a basis to calculate the wheel-shaft torque correction amount ΔTw required for approximating the vibration state Yosc of the object vibration to zero. For example, in calculating the wheel-shaft torque correction amount ΔTw under feedback control for the vibration state Yosc of the object vibration, the wheel-shaft torque correction amount calculation section 700 uses a gain, as K, of the feedback to perform the calculation using Formula (4).

[Math. 4]

$$\Delta Tw = -K \times Yosc \quad (4)$$

The wheel-shaft torque correction amount ΔTw calculated in this way turns to a value which has an average value of zero and varies with a frequency corresponding to the object vibration.

In subsequent step S73, the wheel-shaft torque correction amount calculation section 700 outputs the calculated wheel-shaft torque correction amount ΔTw to the target voltage calculation section 900, following by terminating the present procedure.

<Battery State Estimation Section>

Figure 18:
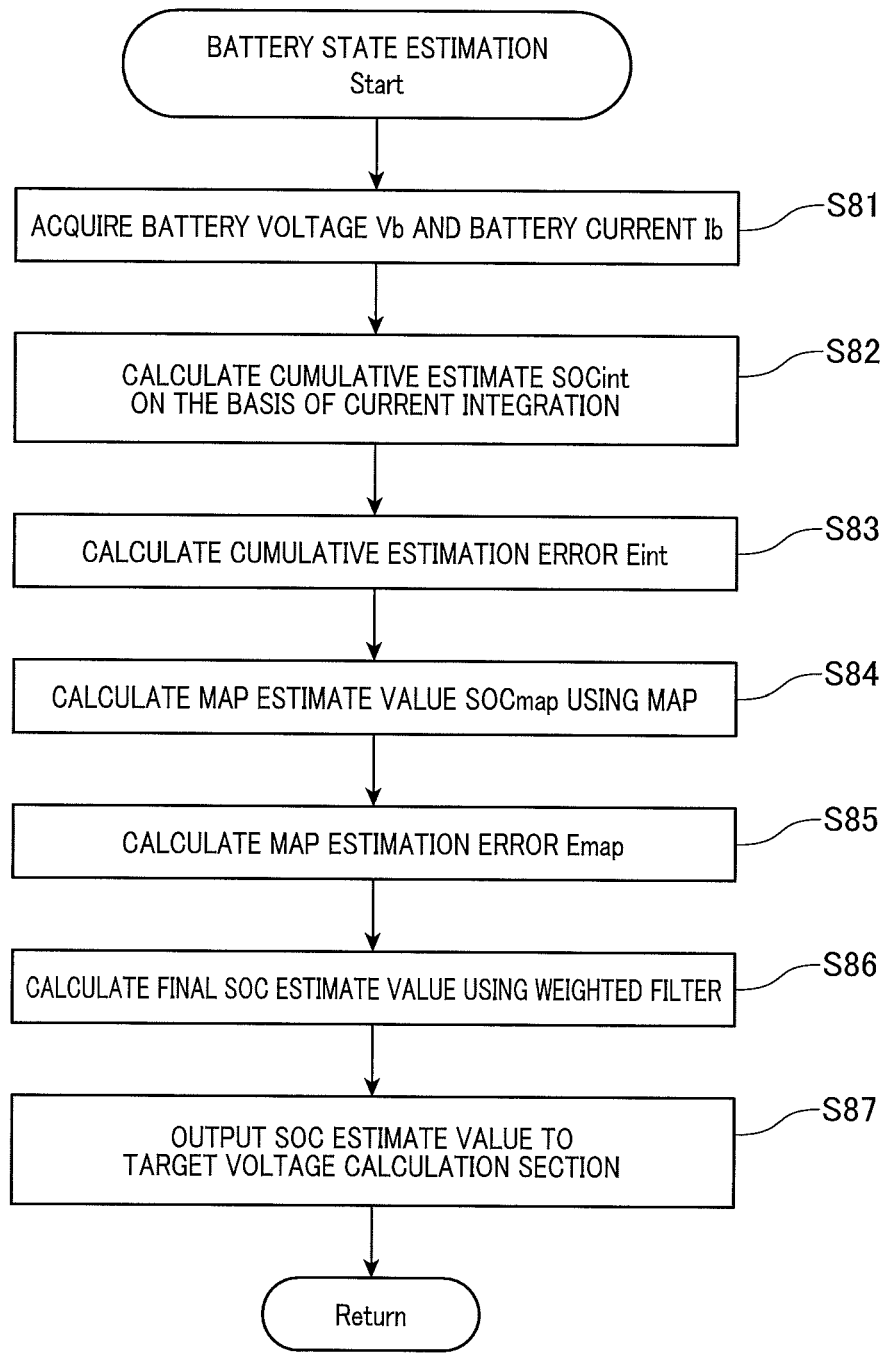
FIG. 18 is a flow chart illustrating a procedure of an arithmetic operation performed by a battery state estimation section.

The battery state estimation section 800 repeatedly performs a procedure shown in FIG. 18 at a predetermined cycle to repeatedly estimate SOC (state of charge) as a battery state quantity that indicates a charge state of the battery. It should be noted that SOC indicates a ratio of a residual capacity to a full-charge capacity in terms of percentage.

First, in S81, the battery state estimation section 800 acquires the battery voltage Vb and the battery current Ib.

In subsequent S82, the battery state estimation section 800 integrates the battery current Ib to calculate an estimate value (hereinafter referred to as "cumulative estimate") SOCint of SOC. Specifically, the battery state estimation section 800 calculates the estimate value according to Formula (5), where a battery capacity upper limit (full-charge capacity) is indicated by Qmax [As], and an operation cycle of the battery state estimation section 800 is indicated by Δt [s].

[Math. 5]

$$SOCint \leftarrow SOCint + \frac{Ib \times \Delta t}{Qmax} \times 100 \quad (5)$$

In subsequent S83, the battery state estimation section 800 calculates a cumulative estimation error Eint included in the cumulative estimate value SOCint. Specifically, the battery state estimation section 800 calculates the error according to Formula (6), where an error increased per integration is indicated by a unit error ΔE. However, the unit error ΔE is a fixed value calculated in advance through experiments or the like.

[Math. 6]

$$Eint \leftarrow Eint + \Delta E \quad (6)$$

In other words, in a calculation method based on current integration, an error included in an estimate value is integrated likewise. Therefore, the cumulative estimation error Eint is used for evaluating the cumulative error.

In subsequent S84, the battery state estimation section 800 uses, as bases, the battery voltage Vb and battery current Ib acquired in S81 to calculate an estimate value (hereinafter referred to as "map estimate") SOCmap of SOC, using a SOC estimation map prepared in advance.

The SOC estimation map is prepared by obtaining a relationship between the battery current Ib and SOC (Ib-SOC characteristics) for each battery voltage Vb through experiments and mapping the relationship.

Specifically, as shown in FIG. 19 (a), where the battery voltage Vb is fixed, if the battery current Ib is a charging current (positive current), the absolute value of the battery current Ib becomes smaller as SOC is approximated to 100%, whereas, if the battery current Ib is a discharging current (negative current), the absolute value of the battery current Ib becomes smaller as SOC steps away from 100%. Further, when the battery voltage Vb in a state of performing neither charge nor discharge is rendered to be a specified voltage, the inclination of the graph becomes steeper as the battery voltage Vb is approximated to the specified voltage.

Among the Ib-SOC characteristics shown in FIG. 19 (a), the graph coinciding with an axis of the battery current Ib=0 (the one with an inclination zero) corresponds to a case where the battery voltage Vb is equal to the specified voltage. As the battery voltage Vb steps away from the specified voltage, the inclination of the graph becomes smaller.

In subsequent S85, the battery state estimation section 800 uses the battery voltage Vb as a basis to calculate a map estimation error Emap included in the map estimate value SOCmap calculated in S83, using an error estimation map prepared in advance.

The error estimation map is prepared by calculating, from the SOC estimation map, an estimation error of the map estimate value SOCmap relative to the battery voltage Vb, and mapping the estimation error. Specifically, as the inclination of the graph of the SOC estimate map is steeper, the map estimate value SOCmap is varied to a larger extent by only a slight variation of the battery current Ib. Accordingly, the accuracy of estimating the map estimate value SOCmap is worsened.

Specifically, as shown in FIG. 19 (b), the inclination of the graph becomes larger as the battery voltage Vb is nearer to the specified voltage. Accordingly, the inclination is maximized when the battery voltage Vb is the specified voltage and minimized as the battery voltage Vb steps away from the specified voltage.

In subsequent S86, the battery state estimation section 800 calculates a final SOC estimate value (hereinafter referred to as "charge state estimate value") using a weighted filter. In the weighted filter, the estimation errors Eint and Emap calculated in S83 and S85, respectively, for the two estimate values SOCint and SOCmap calculated in S82 and S84, respectively, are used as weights of evaluation.

Specifically, the battery state estimation section 800 calculates charged electric charge Q [As] according to formula (8), using a weight W calculated from Formula (7), and converts the charged electric charge Q to a charge-state estimate value SOC according to Formula (9). Further, the battery state estimation section 800 updates the cumulative estimation error Eint using the weight W, on the basis of Formula (10). However, Qint indicates charged electric charge calculated from SOCint.

[Math. 7]

$$W = \frac{Eint}{Eint + Emap} \quad (7)$$

$$Q = Qint + Qmax \times W \times \frac{(SOCmap - SOCint)}{100} \quad (8)$$

$$SOC = \frac{Q}{Qmax} \times 100 \quad (9)$$

$$Eint \leftarrow (1 - W) \times Eint \quad (10)$$

Specifically, the weight W becomes larger as the cumulative estimation error Eint becomes larger. As the weight becomes larger, the charge-state estimate value SOC is calculated putting more importance on the map estimate value SOCmap. Further, as more importance is put on the map estimate value SOCmap (i.e. as the weight W becomes larger), the cumulative estimation error Eint is updated with a smaller value. In this way, the cumulative estimation error Eint is prevented from being unlimitedly increased.

An initial value of the cumulative estimation error Eint may be set to a very large value, while the battery voltage Vb is set to the target voltage Va (stepped away by a large degree from the specified voltage) which makes smaller the map estimation error Emap. Then, the battery voltage Vb and the battery current Ib detected when the voltage regulator 4 is activated with this setting, may be used as bases to calculate the charge-state estimate value SOC. In this way, the charge-state estimate value SOC is substantially calculated from the SOC estimation map alone. Therefore, at the start of control, the charge-state estimate value SOC calculated in this way may be used as an initial value of the cumulative estimate SOCint.

In subsequent S87, the battery state estimation section 800 outputs the calculated charge-state estimate value SOC to the target voltage calculation section 900, followed by terminating the present procedure.

<Target Voltage Calculation Section>

Figure 20:
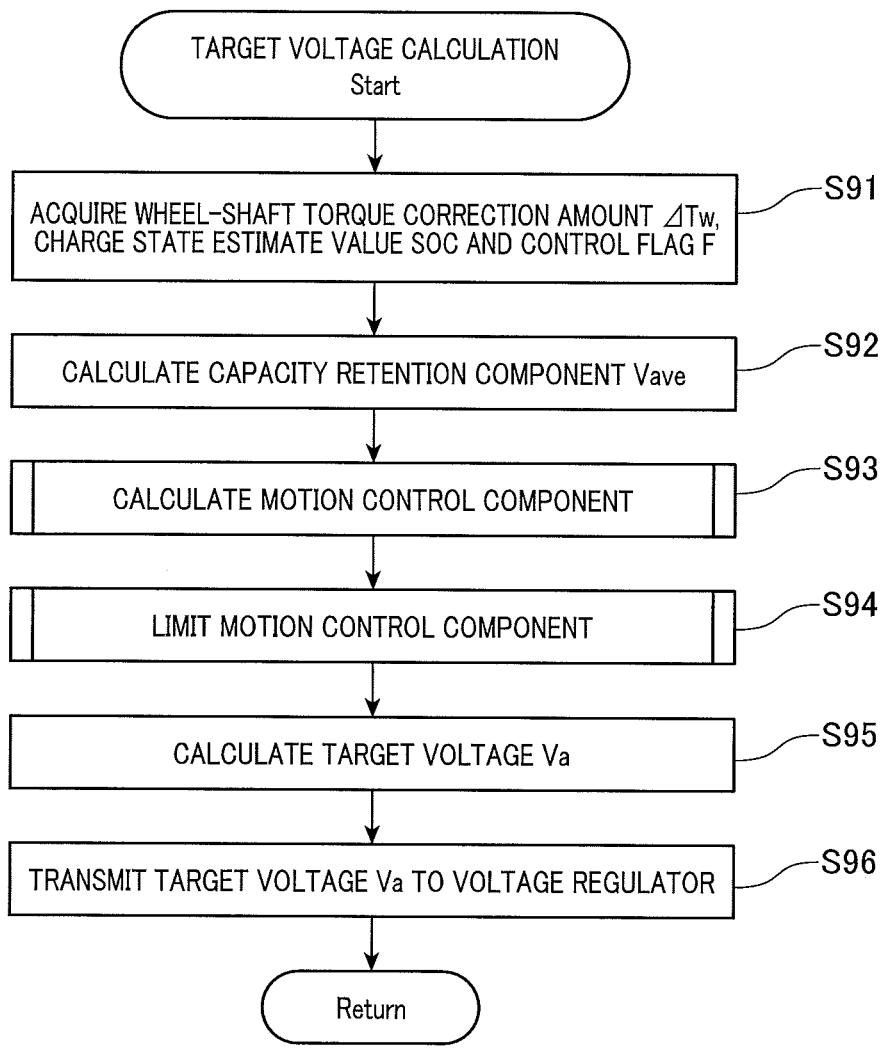
FIG. 20 is a flow chart illustrating a procedure of an arithmetic operation performed by a target voltage calculation section.

The target voltage calculation section 900 repeatedly performs a procedure shown in FIG. 20 at a predetermined cycle to repeatedly calculate the target voltage Va.

First, in S91, the target voltage calculation section n900 acquires the wheel-shaft torque correction amount ΔTw from the wheel-shaft torque correction amount calculation section 700, the control flag F from the generator condition estimation section 300, and the charge-state estimate value SOC from the battery state estimation section 800.

In subsequent S92, the target voltage calculation section 900 uses the charge-state estimate value SOC as a basis to calculate a capacity retention component (capacity retention command value) Vave that is a component of the target voltage Va used for battery charge/discharge control, using a capacity retention component conversion map.

Figure 21:
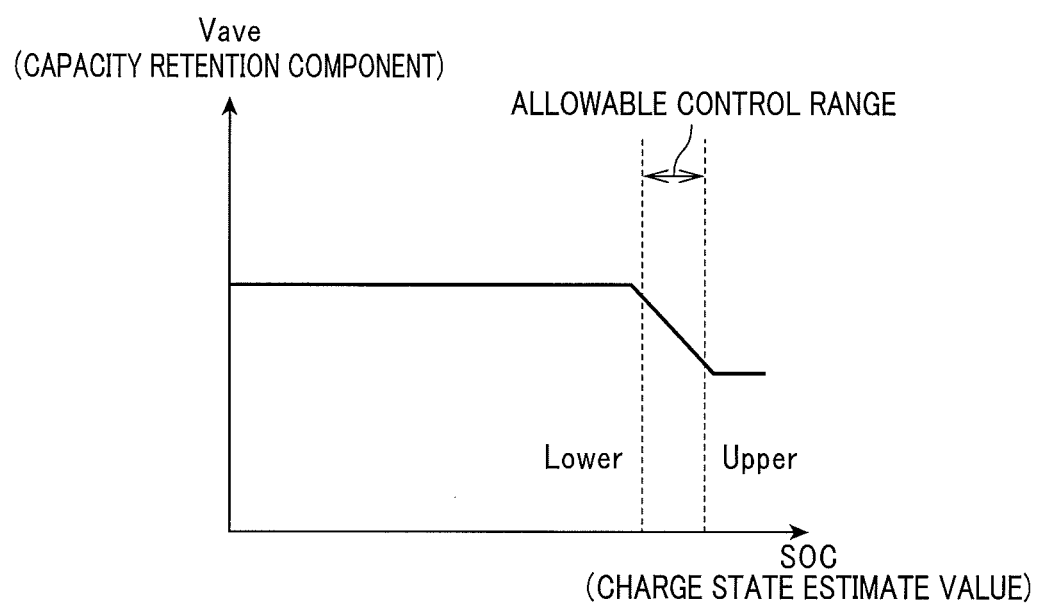
FIG. 21 is a graph explaining a map used for calculating a capacity retention component of target voltage.

As shown in FIG. 21, the capacity retention component conversion map is set such that: when the charge-state estimate value SOC is larger than a preset upper limit of the allowable control range, a constant lower-limit control value is taken; when lower than the lower limit of the allowable control range, a constant upper-limit control value is taken; and, when within the allowable control range, a continuously varying value between the upper-limit control value and the lower-limit control value is taken according to the charge-state estimate value SOC. Note that the upper limit of the allowable control range is set to a value that enables acceptance of a generated current that is generated by a motion control component (motion control command value) ΔVa which is a component of the target voltage Va used for vehicle motion control. The lower limit of the allowable control range is set to a value that enables supply of a required electric power when the electrical load 6 is maximized.

In addition, in the allowable control range, decrease of the charge-state estimate value SOC leads to increase of the capacity retention component Vave, which leads to increase of the supply power from the generator 3. Conversely, increase of the charge-state estimate value SOC leads decrease of the capacity retention component Vave, which leads to decrease of the power supply from the generator 3. Thus, the residual capacity of the battery 5 is controlled such that the charge-state estimate value SOC is retained within the allowable control range.

However, since the variation of the charge-state estimate value SOC is very slow, the variation of the capacity retention component Vave is also very slow. In other words, the value varies with a very low frequency (e.g., less than 1 Hz).

In subsequent S93, the target voltage calculation section 900 performs a motion control component calculation process for calculating, from the wheel-shaft torque correction amount ΔTw, the motion control component ΔVa that is a component of the target voltage Va used for vibration damping control over an object vibration.

In subsequent S94, the target voltage calculation section 900 performs a motion control component limitation process for limiting the calculated motion control component ΔVa according to the state of a device.

In subsequent step S95, the target voltage calculation section 900 adds the capacity retention component Vave calculated in S92 to the motion control component ΔVa calculated in S93 and 94 to thereby calculate the target voltage Va.

In subsequent S96, the target voltage calculation section 900 provides the calculated target voltage Va as a command value to the voltage regulator 4 via the communicating means 15, followed by terminating the present procedure.

In other words, the ECU 7 calculates, as the target voltage Va (command value for the voltage regulator 4), the sum of: a component of low frequency (frequency lower than at least that of an object vibration) used for retaining the charge-state estimate value SOC within the allowable control range (capacity retention component Vave); and a component of high frequency (frequency equal to that of the object vibration) used for cancelling the vehicle vibration (motion control component ΔVa).

Then, the voltage regulator 4 duty-controls the field current so that the generated voltage of the generator 3 will be the target voltage Va to thereby allow the drive torque of the generator 3 to turn to a desired value. As a result, the charge/discharge control for the battery 5 based on the capacity retention component Vave is realized concurrently with the motion control (vibration camping control) based on the motion control component ΔVa.

<Motion Control Component Calculation>

Figure 22:
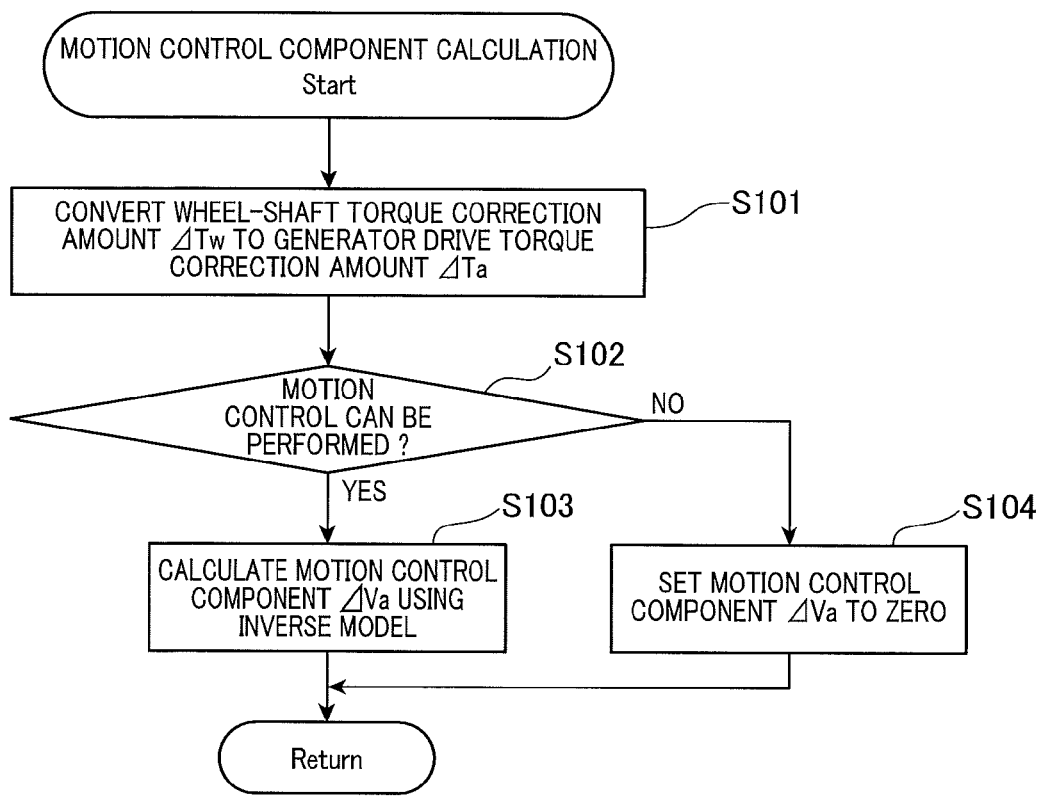
FIG. 22 is a flow chart illustrating a detailed procedure of an arithmetic operation in motion component calculation performed by the target voltage calculation section.

In the motion control component calculation process performed in S93 mentioned above, the target voltage calculation section 900 performs a procedure shown in FIG. 22 to calculate the motion control component ΔVa suitable for the wheel-shaft torque correction amount ΔTw.

First, in S101, the target voltage calculation section 900 converts the wheel-shaft torque correction amount ΔTw to a generator drive torque correction amount ΔTa using the engine-wheel shaft gear ratio GR and the engine-generator gear ratio RP, according to Formula (11).

[Math. 8]

$$\Delta Ta = \Delta Tw \times \frac{1}{GR \times RR} \qquad (11)$$

The generator drive torque correction amount ΔTa converted in this way turns to a value, similar to the wheel-shaft torque correction amount ΔTw, which has an average value of zero and varies according to the frequency of an object vibration.

In subsequent S102, the target voltage calculation section 900 determines whether or not the generator 3 is in a state of being able to perform motion control, on the basis of the control flag F. If the generator 3 is in a state of being able to perform the motion control (F=1), the control proceeds to S103, but if in a state of not being able to perform the motion control (F=0), the control proceeds to S104.

In S104, the target voltage calculation section 900 calculates the motion control component ΔVa from the generator drive torque correction amount ΔTa using an inverse model of a control model which indicates characteristics covering from when the target voltage Va is instructed until when the generator drive torque Ta varies. Then, the present procedure is terminated.

On the other hand, in S105, the target voltage calculation section 900 sets the motion control component ΔVa to zero and then terminates the present procedure.

Specifically, when the generator 3 is in a state of not being able to perform the motion control, the motion control component ΔVa is ensured to be set to zero to inhibit the motion control relying on the generator drive torque to thereby perform only the control, which relies on the capacity retention component Vave, for retaining the battery residual capacity within the predetermined range.

<<Control Model>>

The following is a description regarding a control model (forward-direction model) of a control system that generates generator drive torque Ta from the target voltage Va. As shown in FIG. 23 (*a*), the control model is configured by: a subtractor that calculates the difference between the target voltage Va and generated voltage; a voltage regulator model M1 defined by the characteristics of converting the output of the subtractor to a field current duty value Fduty; a generator model M2 defined by Fduty-torque characteristics M21 that indicate a relationship between the field current duty value Fduty and the drive torque generated by the generator 3, and torque-current dimension conversion characteristics M22 that indicate a relationship between the drive torque and the generated current Ia; and a battery model M3 defined by characteristics that indicate a relationship between the generated current Ia supplied to the battery 5 and generated voltage. It should be noted that dynamic characteristics, for which time factors are taken account, are used for the characteristics of these models.

As shown in FIG. 23 (*b*), an inverse model of the control model (hereinafter referred to as "control inverse model") is configured by: a generator inverse model RM2 defined by inverse characteristics of the Fduty-torque characteristics (i.e. torque-Fduty characteristics) RM21 and the torque-current dimension conversion characteristics (similar to the forward-direction model) M22; a voltage regulator inverse model RM1 defined by characteristics of converting the field current duty value Fduty to a voltage value; the battery model M3 similar to that of the forward-direction model; and an adder that adds the output of the voltage regulator inverse model to the output of the battery model to calculate a target voltage.

Figure 24:
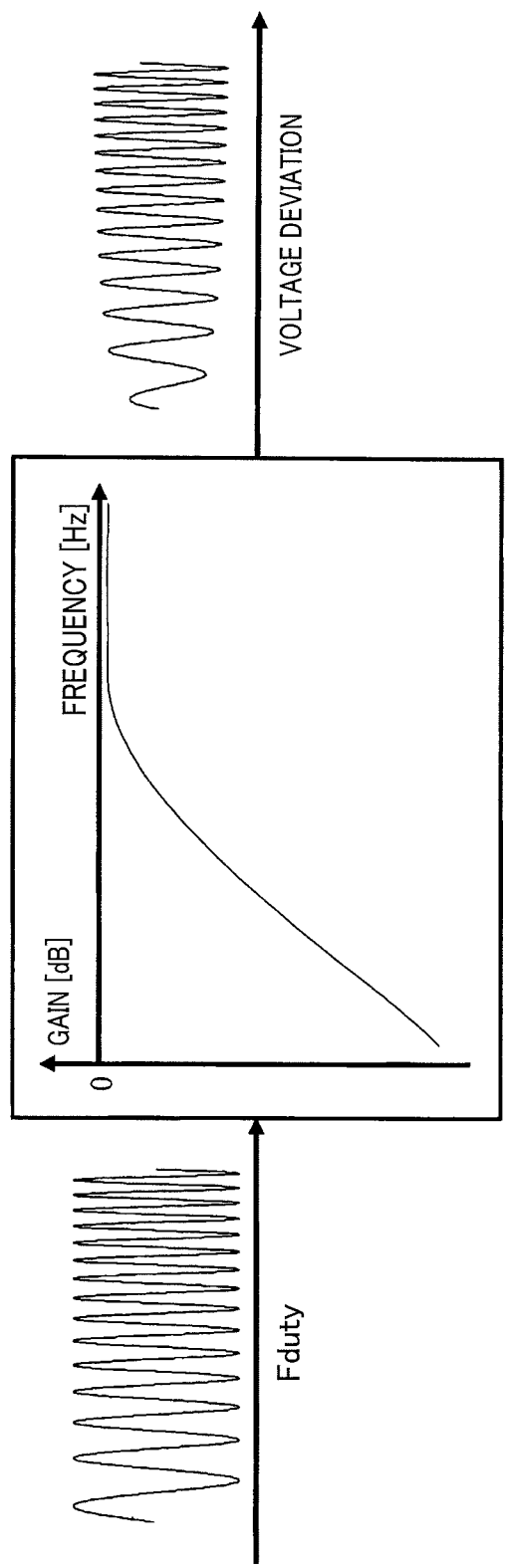
FIG. 24 is an explanatory diagram related to dynamic characteristics of a voltage regulator inverse model.
Figure 25:
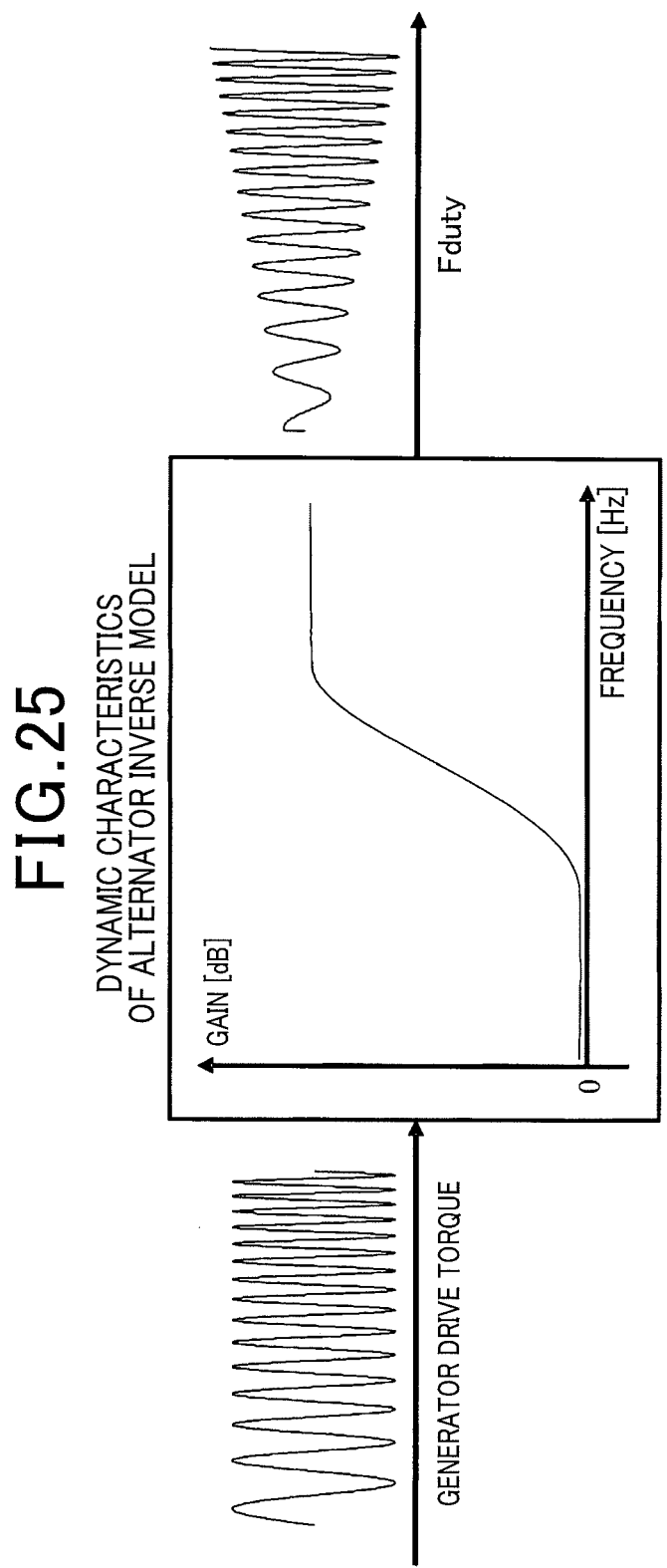
FIG. 25 is an explanatory diagram related to dynamic characteristics of a generator inverse model.
Figure 26:
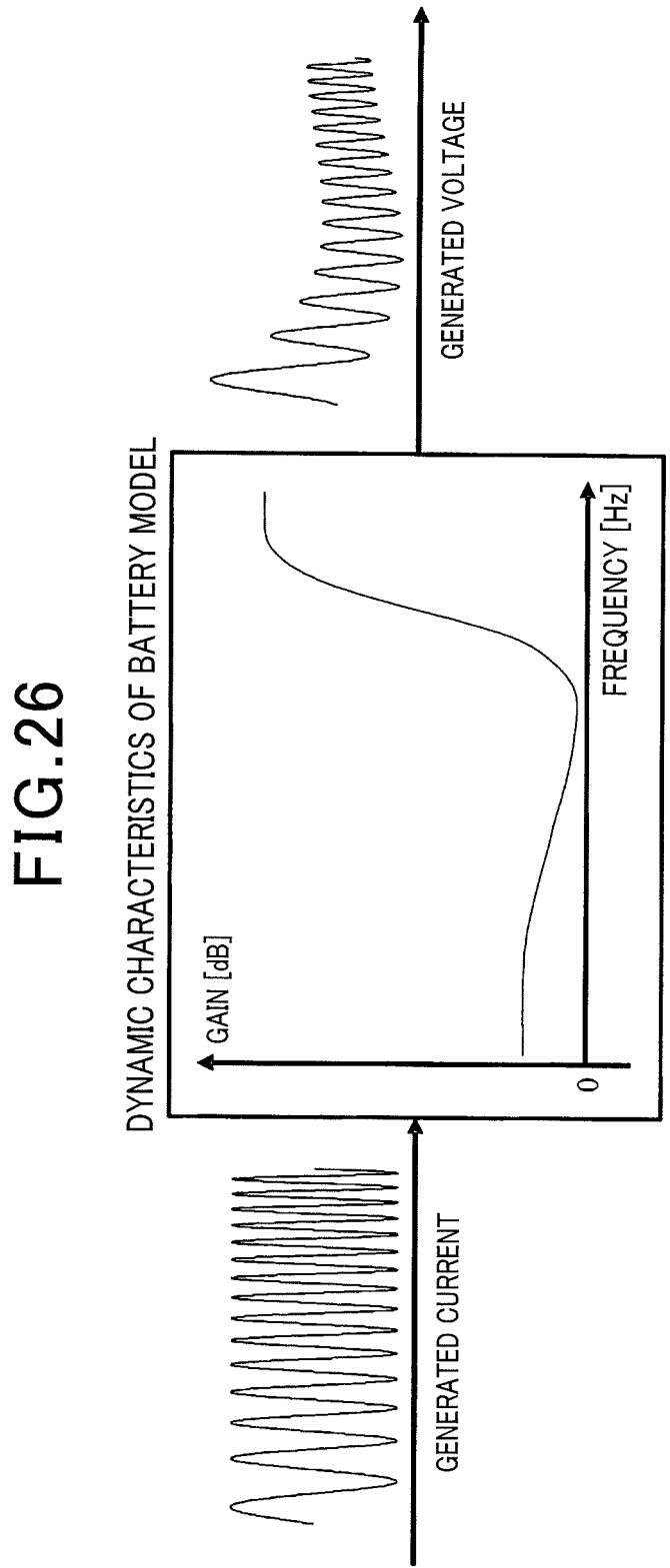
FIG. 26 is an explanatory diagram related to dynamic characteristics of a battery model.

As far as the actual voltage regulator 4 and generator 3 are concerned, they have characteristics in which the degree of not following the variation becomes higher as the frequency of an input becomes higher to thereby attenuate the amplitude of an output. Thus, the voltage regulator inverse model RM1 (see FIG. 24) and the torque-Fduty characteristics RM21 of the generator inverse model RM2 (see FIG. 25) exhibit characteristics of having a larger gain with a higher frequency of input. As shown in FIG. 23, the battery model M3 remains working in the forward direction as well in the reverse model of the control model. Accordingly, as shown in FIG. 26, the battery model M3 is designed so as to reproduce the original battery characteristics.

A transmission function F(s) that indicates the characteristics of the voltage regulator inverse model RM1 is expressed, for example, by Formula (12). A transmission function G(s) that indicates the Fduty-torque characteristics RM21 of the generator reverse model is expressed, for example, by Formula (13). A transmission function H(s) that indicates the characteristics of the battery model M3 is expressed, for example, by Formula (14). However, s indicates a Laplace operator. Parameters, such as areg, are identified, for example, by experiments so that the dynamic characteristics of the individual models are expressed.

[Math. 9]

$$F(s) = \frac{b_{reg}s}{a_{reg}s + 1} \qquad (12)$$

$$G(s) = \frac{b_{alt}s + 1}{a_{alt}s + 1} \qquad (13)$$

$$H(s) = \frac{b_{batt3}s^2 + b_{batt2}s + b_{batt1}}{a_{batt2}s^2 + a_{batt1}s + 1} \qquad (14)$$

The control inverse model designed in this way does not include factors for performing frequency modulation. Accordingly, a variation frequency, as it is, of the motion control component ΔVa calculated using the control inverse model corresponds to the frequency of an object vibration and thus turns to a value that varies with frequency that is sufficiently high for the capacity retention component Vave.

Figure 27:
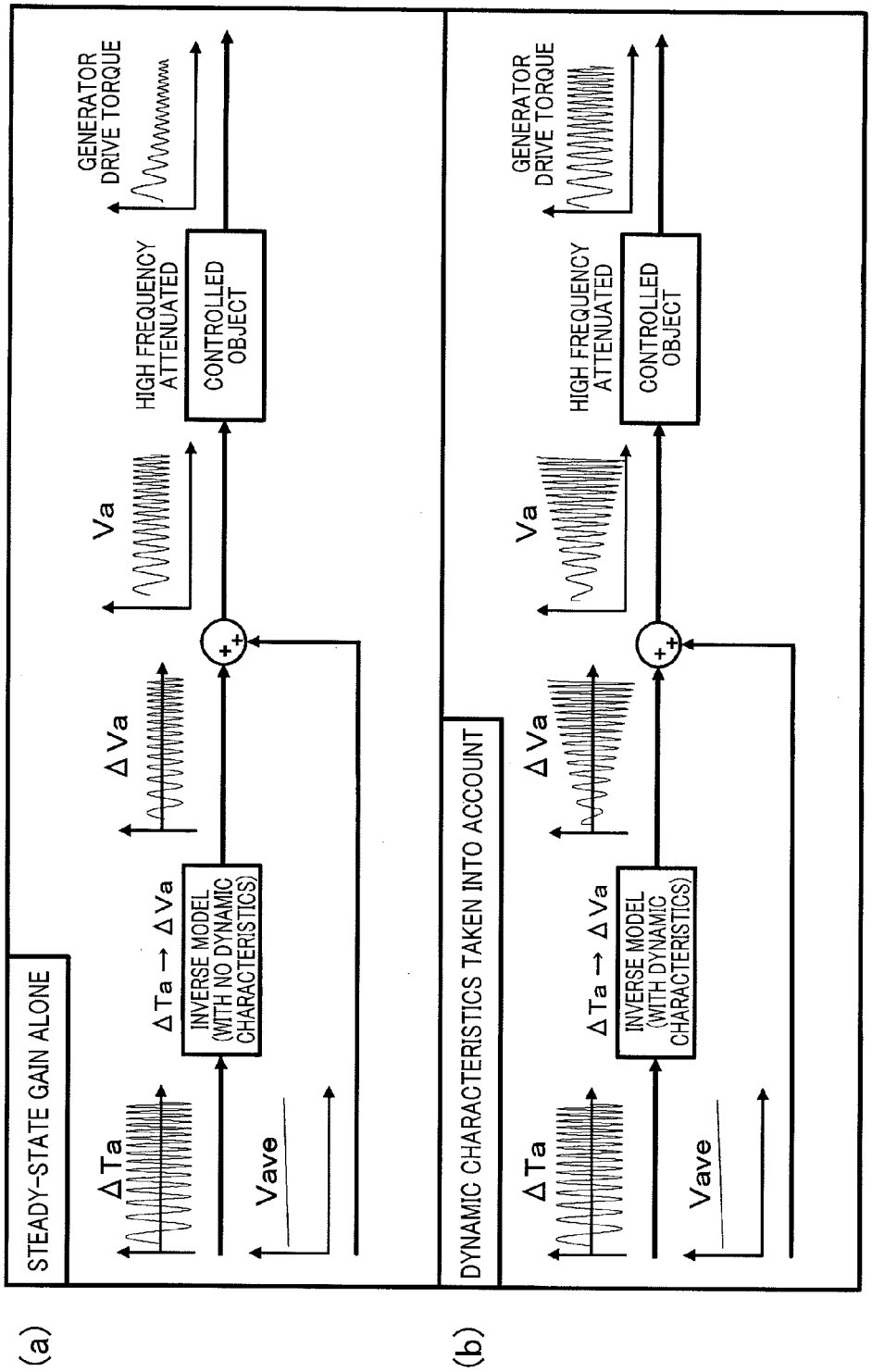
FIG. 27 is an explanatory diagram illustrating effects of the control inverse model, taking account of dynamic characteristics.

FIG. 27 shows how the target voltage Va and the actual generator drive torque vary relative to the generator drive torque correction amount ΔTa that remains unchanged, in a case where, by (a), an inverse model not conforming to dynamic characteristics is used for a controlled object having dynamic characteristics of a delay system, and in a case where, by (b), an inverse model conforming to the dynamic characteristics is used. However, in the case of not conforming to the dynamic characteristics, characteristics in a specific frequency are represented using a map or the like as in a generally used method. In the inverse model shown by (a), characteristics in a low-frequency band are represented.

As shown in FIG. 27 (a), in the case of not conforming to the dynamic characteristics, the same gain acts on all the frequencies of the generator drive torque correction amount $\Delta Ta$. Accordingly, in the resultant motion control component $\Delta Va$, the amplitude of the generator drive torque correction amount $\Delta Ta$ is uniformly varied without relying on frequencies.

On the other hand, as shown in FIG. 27 (b), in the case of conforming to the dynamic characteristics, a high-frequency band that is attenuated in an actual controlled object (generator 3, voltage regulator 4 or battery 5) is amplified. Conversely, in this case, a gain acts on a signal of a low-frequency band, that will be unavoidably amplified as appropriate, to attenuate the signal in advance. Accordingly, in the resultant motion control component $\Delta Va$, the amplitude of the high-frequency band is emphasized.

Regardless of whether or not the dynamic characteristics are taken into account, the target voltage Va is the sum of the motion control component $\Delta Va$ and the capacity retention component Vave. The target voltage Va, when permitted to act on the actual control system, is reflected in the generator drive torque, with a high-frequency side being attenuated.

Accordingly, when the dynamic characteristics are not taken into account in the calculation of the motion control component $\Delta Va$, the correction amount of the generator drive torque decreases, as shown in FIG. 7 (a), in the high-frequency band, and accordingly, a correction is not made as instructed.

On the other hand, when the dynamic characteristics are taken into account in calculating the motion control component $\Delta Va$, the influence of the dynamic characteristics possessed by an actual controlled object is cancelled, as shown in FIG. 27 (b), by a gain that is permitted to unevenly act on each frequency by a control inverse model. Accordingly, a correction is made as instructed, without relying on frequency bands.

It should be noted that the method of calculating the motion control component $\Delta Va$ using a control inverse model can also be effectively applied to the case where a controlled object has dynamic characteristics other than those of a delay system.

<Correction Value Limitation Process>

Figure 28:
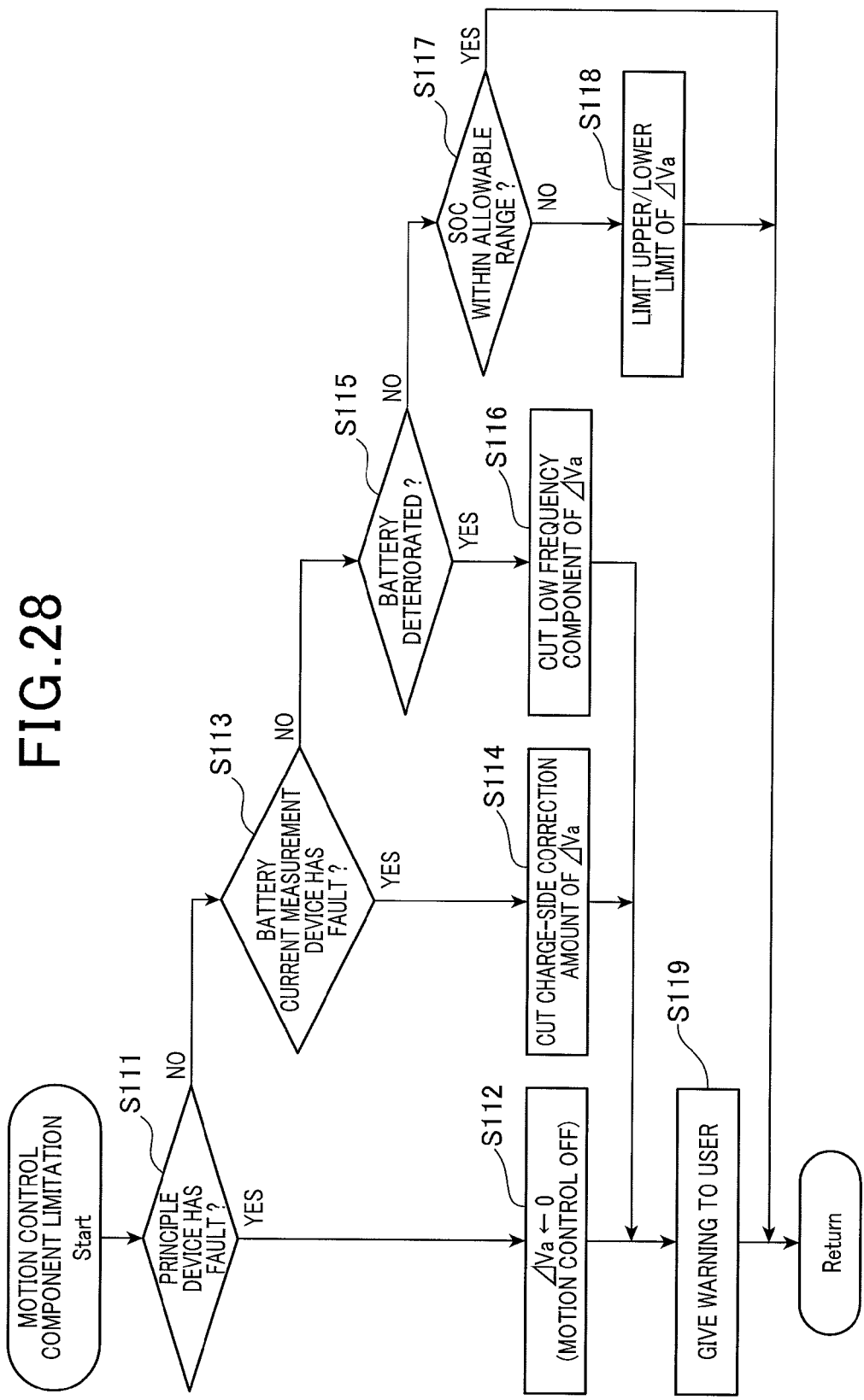
FIG. 28 is a flow chart illustrating a detailed procedure of an arithmetic operation in motion control component limitation calculation performed by the target voltage calculation section.

In a correction amount limitation process performed in S94 described above, a procedure shown in FIG. 28 is performed to limit the motion control component $\Delta Va$ according to the state of a device.

First, in S111, the target voltage calculation section 900 determines whether or not a main device (generator 3, voltage regulator 4, battery 5 or battery voltage sensor 140) has a fault.

Specifically, the target voltage calculation section 900 determines that any one of the main devices has a fault when a state where the battery voltage Vb has a value out of the allowable control range has continued for not less than a predetermined time period, or when a state where the field current duty value Fduty is 100% has continued for not less than a predetermined time period.

If an affirmative determination is made in S111, the target voltage calculation section 900 sets, in S122, the motion control component $\Delta Va$ to zero and inhibits thereafter the motion control by the generator drive torque.

On the other hand, if a negative determination is made in S111, the target voltage calculation section 900 determines, in S113, whether or not the battery current sensor 130 has a fault.

Specifically, the target voltage calculation section 900 makes a determination by monitoring the variations of the battery current Ib and the battery voltage Vb. It should be noted that, since such a determination method is known (e.g., JP-B-4501873), the detailed explanation is omitted here.

If an affirmative determination is made in S113, the target voltage calculation section 900 rectifies, in S114, the waveform of the motion control component $\Delta Va$ to cut a waveform that acts on a charge side of the battery 5. In other words, when the charge state of the battery 5 exceeds an upper limit of the allowable control range of SOC, there is a probability that the battery 5 is not able to accept the generated current that is generated due to the motion control component $\Delta Va$. Therefore, in a state where the battery current sensor 130 has a fault and thus the charge state of the battery 5 cannot be derived, the waveform on the discharge side alone is used to perform the motion control.

If a negative determination is made in S113, the target voltage calculation section 900 determines, in S115, whether or not the battery 5 is deteriorated, exceeding an allowable range.

Specifically, the target voltage calculation section 900 estimates an SOH (residual deterioration state) that is a ratio of a full-charge capacity in a deteriorated state to a full-charge capacity in an initial state in terms of percentage, and makes a determination on the basis of whether or not this SOH is lower than a predetermined lower limit threshold. Since an estimation method for SOH is well known (e.g., see JP-A-2003-129927), the detailed explanation is omitted herein. Further, the estimation of SOH may be performed, for example, in the battery state estimation section 800.

If an affirmative determination is made in S115, the target voltage calculation section 900 cuts, in S116, a low-frequency component of the motion control component $\Delta Va$ using a highpass filter or the like. In other words, when an internal resistance increases due to the deterioration of the battery 5, the frequency band that the battery 5 can accept is limited to a high-frequency band. Thus, the motion control is performed using the frequency band that can be accepted.

If a negative determination is made in S115, the target voltage calculation section 900 determines, in S117, whether or not the charge-state estimate value SOC calculated by the battery state estimation section 800 is within the allowable control range.

If an affirmative determination is made in S117, the target voltage calculation section 900 directly terminates the present procedure without adding a limitation to the motion control component $\Delta Va$.

If a negative determination is made in S117, the target voltage calculation section 900 limits, in S118, the upper limit or the lower limit of the motion control component $\Delta Va$. In other words, when the charge-state estimate value SOC exceeds the allowable control range, there is a probability, as mentioned above, that the battery 5 is not able to accept the generated current that is generated due to the motion control component $\Delta Va$. Accordingly, the upper limit of the motion control component $\Delta Va$ is limited according to the charge-state estimate value SOC so as not to exceed the amount of generated current acceptable by the battery 5. Meanwhile, if the charge-state estimate value SOC decreases beyond the allowable range, there is a probability that sufficient electric power cannot be supplied when the power consumption is increased in the electrical load 6. Therefore, the lower limit of the motion control component $\Delta Va$ is limited such that no influence is given to the electrical load 6, i.e. such that the charge state of the battery will not decrease beyond the lower limit that is necessary for retaining power supply to the electrical load 6.

When any one of the procedures of S112, S114 and S116, which is related to a fault, is performed, the target voltage calculation section 900 raises an alarm in subsequent S119 to inform the user (vehicle occupant) of the occurrence of the fault, followed by terminating the present procedure. It should be noted that the alarm may be given by giving a display via any of various in-vehicle monitors (instrument panel center monitor, navigation screen, rearview monitor, meter, etc.), or may be audibly given via an in-vehicle audio device instead of or together with the displaying.

When the procedure of S118 has been performed, since this procedure is not based on a fault but is based on a normal state of the battery, the target voltage calculation section 900 directly terminates the present procedure without giving an alarm to the user. However, when the procedure of S118 has been performed, the user may be informed accordingly in a form that can be distinguished from the alarm mentioned above.

Figure 29:
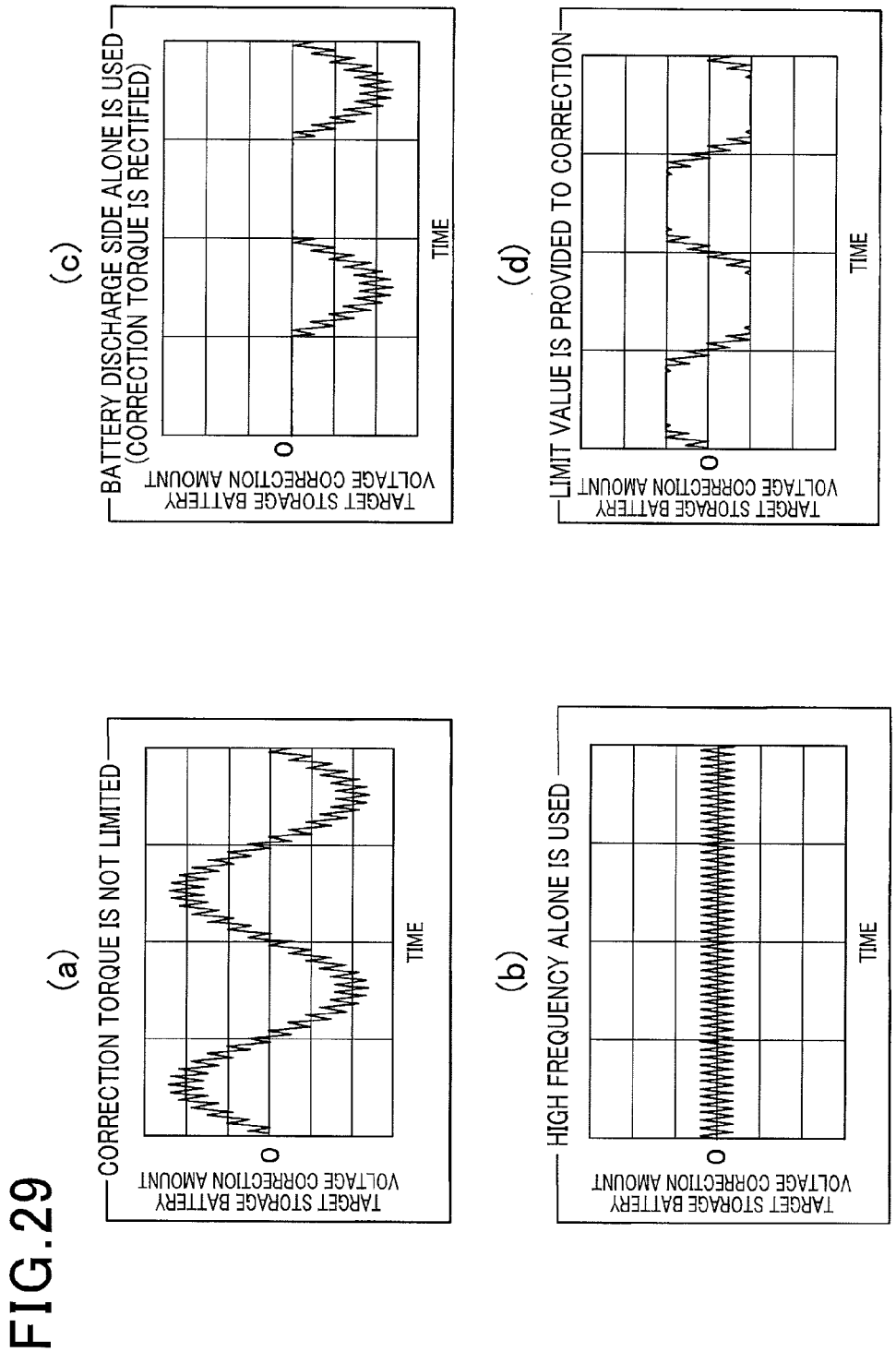
FIG. 29 illustrates waveforms of motion control components, explaining effects of the motion control component limitation calculation.

When the motion control component $\Delta Va$ generated in S93 mentioned above has a waveform as shown in FIG. 29 (a) and when the low-frequency component is cut in S114, the resultant waveform is as shown in FIG. 29 (b). Further, when rectification is performed in S116 and a waveform acting on the charge side is cut, the resultant waveform is as shown in FIG. 29 (c). Furthermore, when the upper limit or the lower limit is limited in S118, the resultant waveform is as shown in FIG. 29 (d).

<Operation>

Figure 30:
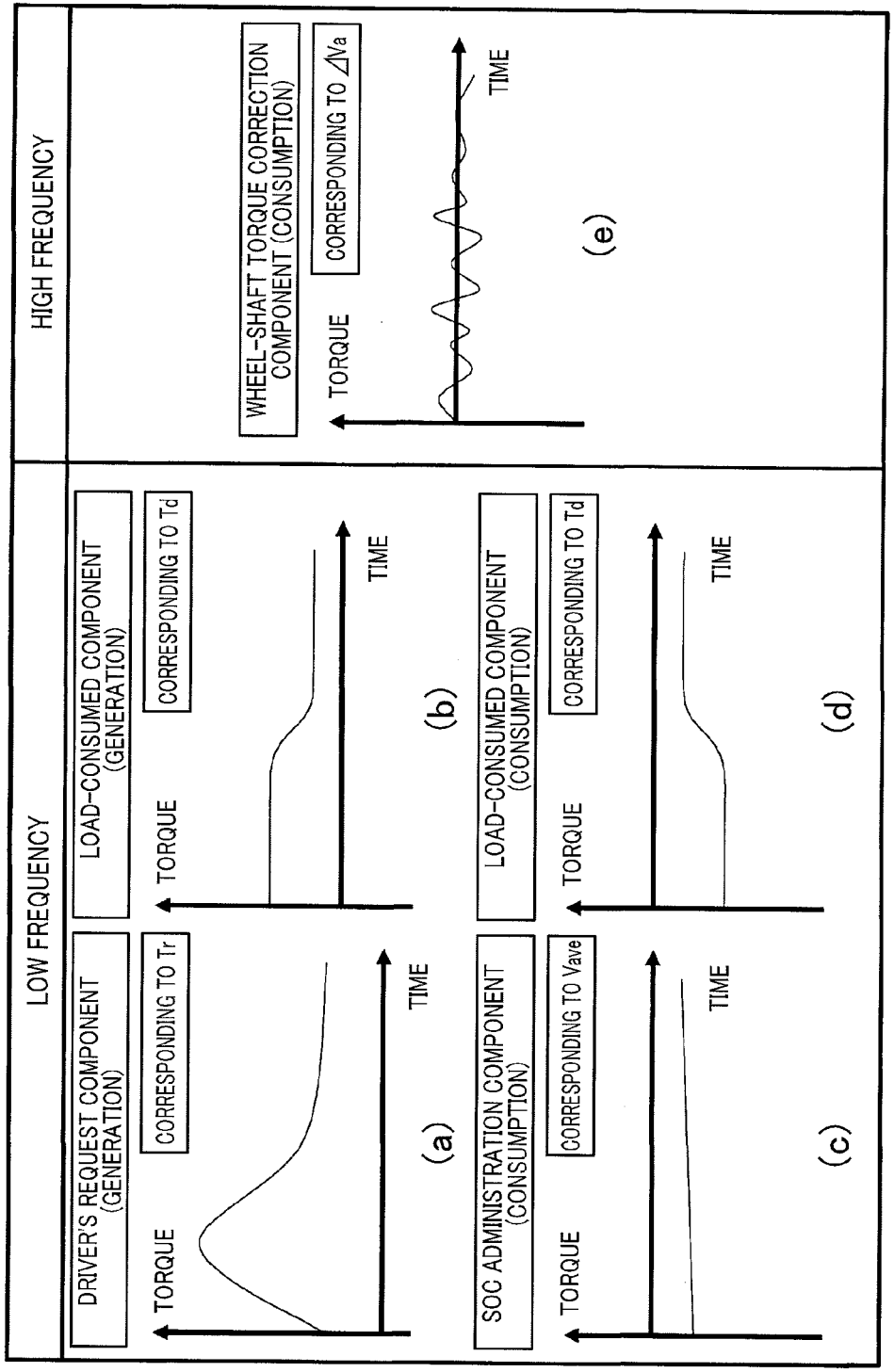
FIG. 30 is an explanatory diagram illustrating components included in engine output-shaft torque.

FIG. 30 lists the components included in the engine output-shaft torque in the present embodiment. In the figure, (a) to (e) indicate driver's request component (corresponding to Tr), load-consumed component (generation: corresponding to Td), SOC administration component (corresponding to Vave), load-consumed component (consumption: corresponding to Td) and wheel-shaft torque correction component (corresponding to $\Delta Va$), respectively.

(b) is a component permitted to be included in advance so as to cancel the consumed component of (d). (b) and (d), which offset with each other, are not transmitted to the wheel shaft. In other words, the wheel-shaft torque has a value resulting from the superposition of (a), (c) and (e).

As described above, the varying frequency of the SOC administration component of (c) (corresponding to Vave) is sufficiently lower compared to the frequency of object vibration, while the varying frequency of the wheel-shaft torque correction component of (e) (corresponding to $\Delta Va$) conforms to the frequency of the object vibration. In other words, in spite of superposing these components, the components do not interfere with each other and hence an intended function is exerted as in a case where channels are defined on a frequency-band basis in radio communication. Further, even when a plurality of vibrations are concurrently subjected to vibration damping, the vibrations can be individually subjected to vibration damping as far as the frequencies of the vibrations are sufficiently deviated from each other. In this way, a single target voltage Va leads to the realization of two functions of motion control (vibration damping control) and battery charge/discharge control.

<Advantageous Effects>

As described so far, in the present embodiment, vehicle vibration is estimated from a driver's request torque, and the estimation result is used for calculating the motion control component $\Delta Va$, according to which the generation amount, or further, the generator drive torque, is varied. As a result of the variation, the wheel-shaft torque is corrected to thereby suppress the vehicle vibration.

Moreover, the motion control component $\Delta Va$ of the target voltage Va is calculated using a control inverse model that takes account of the dynamic characteristics of the actual control system (generator 3, voltage regulator 4 and battery 5). Accordingly, when the motion control component $\Delta Va$ is permitted to act on the actual control system, the influence of the dynamic characteristics (gain variation depending on frequencies) is cancelled. As a result, the wheel-shaft torque is corrected as instructed (motion control component $\Delta Va$) without relying on frequency bands. Thus, motion control (vibration damping control) with excellent accuracy can be realized.

In the present embodiment, the generator 3 is controlled by the voltage regulator 4, while the control system (i.e. control system related to the calculation of the motion control component $\Delta Va$) necessarily includes the battery 5. Accordingly, the generator 3 can be controlled taking account of the characteristics of the battery 5. Thus, the motion control described above can be applied, irrespective of the type of the battery, or in particular, irrespective of the current accepting capacity. Generally, the motion control described above is particularly effective when applied to a lead battery (having small current accepting capacity) used in a vehicle having an internal combustion engine.

In the present embodiment, the capacity retention component Vave is calculated on the basis of the charge-state estimate value SOC. Accordingly, the varying frequency of the capacity retention component Vave can be made small, being sufficiently deviated from the frequency of an object vibration, i.e. from the varying frequency of the motion control component $\Delta Va$.

Accordingly, the waveform of the torque based on the capacity retention component Vave of the drive torque of the generator 3 is prevented from interfering with the waveform of the torque based on the motion control component $\Delta Va$ of the drive torque. Thus, the single target voltage Va can balance the battery charge/discharge control with the vehicle control (vibration damping control).

In the present embodiment, a lowpass filter is permitted to work on the load-consumed torque Td as a command value for permitting the engine 1 to realize a required torque (S44) to thereby remove the frequency component of the frequency band, which is equivalent to that of the object vibration. Therefore, the torque generated by the motion control component $\Delta Va$ is prevented from being cancelled by the control of the electric throttle valve 2. As a result, the motion control relying on the motion control component $\Delta Va$ can be efficiently performed.

In the present embodiment, the cumulative estimate value SOCint calculated by integrating the battery current Ib, and the map estimate value SOCmap calculated according to a characteristics map prepared in advance are used to perform a weighted calculation. In the weighted calculation, the estimation errors Eint and Emap of the respective estimate values are used as weights to thereby calculate the charge-state estimate value SOC used for calculating the capacity retention component Vave. Thus, compared to the case where any one of estimation methods is used, improvement is achieved in the accuracy of estimating the charge-state estimate value SOC, or further, in the accuracy of battery charge/discharge control.

In the present embodiment, the motion control component $\Delta Va$ is limited according to the states of various devices that configure the control system for generating the drive torque of the generator 3 based on the target voltage Va. As a result of the limitation, a visual or audible alarm are given to the user (vehicle occupant) in the case, in particular, where any fault or deterioration is caused in a device. Thus, a fault or deterioration of a device, which would otherwise have been accelerated by being left as it is, is prevented from being accelerated, or other in-vehicle electronic equipment is prevented from being adversely affected by the fault or deterioration of the device.

In particular, when a principle device essential for normally operating the generator 3 has a fault, the motion control component $\Delta Va$ is set to zero to inhibit the motion control from being performed. Therefore, other in-vehicle equipment is prevented from being adversely affected by the performance of unnecessary control.

Further, in the occurrence of a fault in the battery current sensor 130 that is a device required for estimating the charge state of the battery 5, the component of the motion control component $\Delta Va$, which acts on the direction of charging the battery 5, is set to zero to perform the motion control only based on the component that acts on the direction of discharging the battery 5. Thus, the battery 5 can be prevented from being deteriorated, which deterioration would be caused by an overcharged state of the battery 5.

Further, the motion control component $\Delta Va$ is limited such that the frequency band subjected to motion control is limited according to the deterioration state of the battery 5. Thus, even when the battery 5 is deteriorated, the motion control can be continued with a frequency band that the battery 5 can accept.

Further, the upper limit or the lower limit of the motion control component $\Delta Va$ is limited according to the charge state of the battery 5, in the case where the charge-state estimate value SOC is out of the allowable control range. Therefore, other in-vehicle equipment is prevented from being influenced from the fact that the battery 5 is unable to accept the generated current generated by the motion control component $\Delta Va$, or the fact that sufficient power cannot be supplied when the power consumption of the electrical load 6 is increased.

Other Embodiments

The present invention is not limited to the foregoing embodiment but may be implemented in various modes.

For example, in the control inverse model shown in FIG. 23 (b), the path passing through the generator inverse model RM2 (torque-Fduty characteristics RM21) and the voltage regulator inverse model RM1 exerts a high effect when the varying frequency of the torque correction amount $\Delta Ta$ is higher, while the path passing through the generator inverse model RM2 (torque-current dimension conversion characteristics M22) and the battery model M3 exerts a high effect when the varying frequency is lower. Therefore, when the frequency band of an object vibration is limited, simplification may be made such as to omit a path that relatively lowers the effects.

Further, in the control inverse model, dynamic characteristics are reflected in all of the voltage regulator inverse model RM1, the generator inverse model RM2 and the battery model M3. Alternatively, dynamic characteristics may be reflected in any one or two of them.

In the foregoing embodiment, the motion control component $\Delta Va$ calculated in S93 is limited in order to limit the torque based on the motion control component $\Delta Va$. Alternatively, the wheel-shaft torque correction amount $\Delta Tw$ calculated in S72 may be configured to be limited.

Further, in the motion control component limitation process, if the battery 5 is determined to be deteriorated, the low-frequency component of the motion control component $\Delta Va$ is cut. However, for example, in calculating the vibration state Yosc of an object vibration in the vehicle vibration-state estimation section 600 (S63), the vehicle vibration of the vehicle body having the minimum frequency (1 to 5 Hz) may be removed to select only the vibration of the engine-mount system (7 to 15 Hz) and the vibration of the chassis or the tires (not less than 10 Hz) as an object vibration. Alternatively, the two former vibrations of low frequency may be removed to select only the vibration of the chassis and the tires as an object vibration. Further, the selection may be ensured to be switched according to the progress of the deterioration of the battery 5.

In the foregoing embodiment, the command value based on the wheel-shaft torque correction amount $\Delta Tw$ (motion control component $\Delta Va$) is reflected in the target voltage Va. Alternatively, if the voltage regulator 5 is configured to be able to externally correcting the field current duty value Fduty that is set according to the target voltage Va, the following configuration may be provided. Specifically, the capacity retention component Vave may be set as it is as the target voltage Va and at the same time the command value (correction value $\Delta F$duty of Fduty) based on the wheel-shaft torque correction amount $\Delta Tw$ may be reflected in the current duty value Fduty.

In this case, in the motion control component limitation process, the correction amount $\Delta F$duty may be limited, or a correction value $\Delta Ic$ of the field current, which is calculated in the process of calculating the correction value $\Delta F$duty may be limited.

In the foregoing embodiment, SOC (state of charge) is used as a parameter of indicating a residual quantity of the battery. Alternatively, DOD (depth of discharge) may be used. It should be noted that DOD and SOC, whose units are indicated in terms of percentage, have a relationship as expressed by Formula (15) and thus are easily replaceable with each other.

$$SOC[\%]=100[\%]-DOD[\%] \qquad (15)$$

In the foregoing embodiment, the target throttle position calculation section 500 calculates the target throttle position SL as a command value on the basis of the driver's request engine output-shaft torque Tr. However, the command value is not limited to this. In addition to or in place of the target throttle position SL, a fuel injection quantity or ignition timing may be ensured to be calculated.

DESCRIPTION OF THE REFERENCE NUMERALS

20 . . . Alternator (Generator), 21 . . . Regulator, 30 . . . Battery, 70 . . . Wheel-shaft torque correction amount calculating means (Adjusting voltage setting means), 80 . . . Battery charge amount administrating means (Adjusting voltage setting means), 90 . . . Alternator command value calculating means (Adjusting voltage setting means), Va . . . Adjusting voltage.

1 . . . Engine 2 . . . Electric throttle valve 3 . . . Generator 4 . . . Voltage regulator 5 . . . Battery 6 . . . Electrical load 7 . . . Control unit 110 . . . Accelerator stroke sensor 120 . . . Crank rotation angle sensor 130 . . . Battery current sensor 140 . . . Battery voltage sensor 15 . . . Communicating means 200 . . . Driver's request torque estimation section 300 . . . Generator-state estimation section 400 . . . Load-consumed torque calculation section 500 . . . Target throttle position calculation section 600 . . . Vehicle vibration state estimation section 700 ... Wheel-shaft torque correction amount calculation section  800 ... Battery state estimation section 900 ... Target voltage calculation section RM1 ... Voltage regulator inverse model RM2 ... Generator inverse model M3 ... Battery model

What is claimed is:

1. A vibration damping control apparatus for a vehicle, the apparatus being applied to a vehicle including a generator that is driven by an internal combustion engine to generate electric power, a regulator that controls field current passing through an excitation winding of the generator, so that generated voltage of the generator turns to externally instructed adjusting voltage, and a battery that charges the generated power of the generator, characterized in that the apparatus comprises:

an adjusting voltage setting means for setting the adjusting voltage based on a charge supply power request value required for controlling a residual capacity of the battery, and a drive torque request value for the generator required for suppressing vibration of the vehicle.

2. The vibration damping control apparatus for a vehicle according to claim 1, wherein:

the adjusting voltage setting means comprises:

a capacity retention component calculating means for calculating a voltage command value of a capacity retention component of the adjusting voltage, the component being required for controlling a residual capacity of the battery; and a vibration suppression component value calculating means for calculating a voltage command value of a vibration suppression component of the adjusting voltage, the component corresponding to drive torque of the generator and being required for suppressing vibration of the vehicle.

3. The vibration damping control apparatus for a vehicle according to claim 2, wherein:

the capacity retention component calculating means calculates a voltage command value of the capacity retention component from the charge supply power request value having a frequency lower than that of vehicle vibration that is a controlled object;

the vibration suppression component calculating means calculates a voltage command value of the vibration suppression component from the drive torque request value having frequency not less than that of vehicle vibration that is a controlled object; and the vibration suppression component is superposed on a voltage command value of the capacity retention component to provide a waveform as an adjusting voltage for use as a voltage command value for the generator.

4. The vibration damping control apparatus for a vehicle according to claim 2, wherein the vibration suppression component calculating means calculates the vibration suppression component according to a residual capacity of the battery.

5. The vibration damping control apparatus for a vehicle according to claim 2, wherein the vibration suppression component calculating means calculates the vibration suppression component according to which of discharge and charge states the battery is in.

6. The vibration damping control apparatus for a vehicle according to claim 2, wherein the vibration suppression component calculating means calculates the vibration suppression component according to revolution speed of the generator.

7. The vibration damping control apparatus for a vehicle according to claim 1, wherein the adjusting voltage setting means sets a residual capacity of the battery to a value smaller than that of a full charge, so that a generated power component corresponding to the vibration suppression component can be accepted by the battery.

8. A vibration damping control apparatus for a vehicle, the apparatus being applied to a vehicle including a generator that is driven by an internal combustion engine to generate electric power, a regulator that controls field current passing through an excitation winding of the generator, so that generated voltage of the generator turns to externally instructed adjusting voltage, and a battery that charges the generated power of the generator, characterized in that the apparatus comprises:

an adjusting voltage setting means for superposing a first voltage command value for suppressing vibration of the vehicle on a second voltage command value for controlling a residual capacity of the battery to set the adjusting voltage.

9. The vibration damping control apparatus for a vehicle according to claim 8, characterized in that the first voltage command value for suppressing vibration of the vehicle has a frequency higher than a frequency of the second voltage command value for controlling a residual capacity of the battery.

10. The vibration damping control apparatus for a vehicle according to claim 8, characterized in that the first voltage command value for suppressing vibration of the vehicle has a frequency of not less than that of vehicle vibration, and the second voltage command value for controlling a residual capacity of the battery has a frequency lower than that of vehicle vibration.

11. A vibration damping control system for a vehicle characterized in that the system comprises:

a generator that is driven by an internal combustion engine to generate electric power;

a regulator that controls field current passing through an excitation winding of the generator, so that generated voltage of the generator turns to externally instructed adjusting voltage;

a battery that charges generated power of the generator; and an adjusting voltage setting means for setting the adjusting voltage based on a charge supply power request value required for controlling a residual capacity of the battery, and a drive torque request value for the generator required for suppressing vibration of the vehicle.

12. A vehicle motion control apparatus that is applied to a vehicle provided with a control system that includes at least a generator that is driven by an internal combustion engine to generate electric power, a regulator that controls field current according to a command value, the field current passing through an excitation winding of the generator, and a battery that charges generated power of the generator, characterized in that the apparatus comprises:

a capacity retention command value generating means for generating a capacity retention command value, which is the command value for activating the regulator, such that supply power is obtained, the supply power being required for retaining a battery state quantity within a predetermined range, the battery state quantity indicating a charge state of the battery; and a motion control command value generating means for generating a motion control command value that is the command value for activating the regulator such that motion control torque is generated in the generator, the motion control torque being required for controlling vehicle motion specified in advance, wherein the motion control command value generating means comprises a limiting means for limiting the motion control command value, according to states of devices that configure the control system.

13. The vehicle motion control apparatus according to claim 12, wherein:

the limiting means comprises:

a principle device fault determining means for determining, as states of the devices, presence/absence of a fault of a principle device specified in advance among the devices; and an inhibiting means for inhibiting the motion control by setting the motion control command value to zero when the principle device fault determining means determines that the principle device has a fault.

14. The vehicle motion control apparatus according to claim 12, wherein:

the limiting means:

a current sensor fault determining means for determining, as states of the devices, presence/absence of a fault of a current sensor that detects a battery current; and a partially inhibiting means for partially inhibiting the motion control by setting a component of the motion control command to zero, the component acting in a direction of charging the battery, when the current sensor fault determining means determines that the current sensor has a fault.

15. The vehicle motion control apparatus according to claim 12, wherein:

the limiting means comprises:

a deterioration state determining means for determining, as states of the devices, a deterioration state of the battery; and an object limiting means for limiting the motion control command value according to a determination result of the deterioration state determining means, so that a frequency band that is an object of the motion control is limited.

16. The vehicle motion control apparatus according to claim 12, wherein:

the limiting means comprises:

a charge state determining means for determining, as states of the devices, a charge state of the battery; and an upper/lower limit limiting means for limiting an upper or lower limit of the motion control command value according to a determination result of the charge state determining means.

17. The vehicle motion control apparatus according to claim 16, characterized in that the upper/lower limit limiting means limits the motion control command value such that generated current that is generated on the basis of the motion control command value does not exceed an acceptable amount of the generated current that depends on a charge state of the battery.

18. The vehicle motion control apparatus according to claim 16, wherein the upper/lower limit limiting means limits the motion control command value such that a charge state of the battery does not lower a lower limit state required for retaining a power supply for an electrical load, due to generated current that is generated based on the motion control command value.

19. The vehicle motion control apparatus according to claim 12, wherein the apparatus comprises a warning means for giving a warning, when the motion control command value is limited by the limiting means, accordingly.

20. The vehicle motion control apparatus according to claim 12, wherein:

the motion control command value is generated based on a wheel-shaft torque correction amount applied to a wheel shaft in order to perform the motion control; and the limiting means treats the wheel-shaft torque correction amount as an object of limitation.

21. A vehicle motion control apparatus applied to a vehicle including a generator that is driven by an internal combustion engine to generate electric power, a voltage regulator that controls field current passing through an excitation winding of the generator, so that generated voltage of the generator turns to a specified target voltage, and a battery that charges the generated power of the generator, characterized in that the apparatus comprises:

a capacity retention component generating means for generating a capacity retention component that is a component of the target voltage for activating the voltage regulator such that a supply power is obtained, the supply power being required for retaining a battery state quantity within a predetermined range, the battery state quantity indicating a charge state of the battery;

a motion control component generating means for generating a motion control component that is a component of the target voltage for activating the voltage regulator such that motion control torque is generated in the generator, the motion control torque being required for controlling vehicle motion specified in advance; and a target voltage generating means for generating the target voltage by superposing the motion control component on the capacity retention component, wherein the motion control component generating means uses a control model as a basis, the control model being a modelization of a control system that generates drive torque of the generator according to the target voltage, the modelization being provided taking account of dynamic characteristics possessed by the control system, to thereby calculate the motion control component from the motion control torque by using a control inverse model that is an inverse model of the control model.

22. The vehicle motion control apparatus according to claim 21 wherein:

among device-unit models including: an inverse model of a voltage regulator model that indicates conversion characteristics in converting a difference between the target voltage and the generated voltage to a duty of the field current;

an inverse model of a generator model that indicates conversion characteristics in converting a duty of the field current to the drive torque in the generator, and a correlation of the drive torque relative to generated current outputted by the generator; and a battery model that indicates conversion characteristics in converting the generated current to the generated voltage, the control inverse model is configured by using at least the inverse model of the voltage regulator and the inverse model of the generator model, or configured by using at least the battery model.

23. The vehicle motion control apparatus according to claim 22, characterized in that dynamic characteristics are reflected in at least one of the device-unit models configuring the control inverse model.

24. The vehicle motion control apparatus according to claim 21, wherein:
   the vehicle motion is vibration caused in the vehicle when request torque according to a drivers request is realized by the internal combustion engine; and
   the motion control torque is torque for suppressing the vibration.

25. The vehicle motion control apparatus according to claim 24, wherein the apparatus comprises a component removing means for removing a frequency component of vibration that is an object of vibration damping, from a command value for allowing the internal combustion engine to realize the request torque.

26. The vehicle motion control apparatus according to claim 21, wherein SOC (state of charge) indicating a ratio of a residual capacity to a full-charge capacity of the battery is used as the battery state quantity.

27. The vehicle motion control apparatus according to claim 26, wherein:
   the capacity retention component generating means comprises:
   a first estimating means for generating a first estimate value that is an estimate value of the SOC by integrating battery current passing through the battery;
   a first error estimating means for calculating a first error that is an error of the first estimate value;
   a second estimating means for generating a second estimate value that is an estimate value of the SOC from battery voltage as voltage across terminals of the battery and the battery current, according to a characteristics map prepared in advance;
   a second error estimating means for calculating a second error that is an error of the second estimate value; and
   an executing means for executing weighted calculation for the first estimate value and the second estimate value, using the first error and the second error as weights, wherein
   the capacity retention component is generated using a calculation result of the executing means.

* * * * *